US012681942B1

(12) United States Patent
Ghatage et al.

(10) Patent No.: US 12,681,942 B1
(45) Date of Patent: Jul. 14, 2026

(54) GENERATIVE ARTIFICIAL INTELLIGENCE-BASED INFORMATION RETRIEVAL

(71) Applicant: ACCENTURE GLOBAL SOLUTIONS LIMITED, Dublin (IE)

(72) Inventors: Prakash Ghatage, Bangalore (IN); Nirav Jagdish Sampat, Mumbai (IN); Naveen Kumar Thangraj, Bangalore (IN); Sangita Agarwal, Bangalore (IN); Sreenivas Sekhar Josyula, Bangalore (IN); Kaustubh Kurhekar, Pune (IN); Sheetalkumar Chaugule, Pune (IN); Priyalatha Padmini Sashikumar, Bangalore (IN); Sattish Sundarakrishnan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 19/097,331

(22) Filed: Apr. 1, 2025

(51) Int. Cl.

*G06F 16/2458* (2019.01)
*G06F 16/334* (2025.01)
*G06F 40/30* (2020.01)
*G06F 40/40* (2020.01)

(52) U.S. Cl.

CPC .......... *G06F 16/2458* (2019.01); *G06F 40/30* (2020.01); *G06F 40/40* (2020.01); *G06F 16/3344* (2019.01)

(58) Field of Classification Search

CPC .. G06F 16/2458; G06F 16/3344; G06F 40/30; G06F 40/40

See application file for complete search history.

(56) References Cited

U.S. PATENT DOCUMENTS

| | | | | |
|---|---|---|---|---|
| 9,704,098 B2 * | 7/2017 | Waltinger | .............. | G06N 20/00 |
| 10,417,334 B2 * | 9/2019 | Wu | .......................... | G06F 16/93 |
| 12,368,745 B1 * | 7/2025 | Guo | .................... | G06F 16/9024 |
| 2010/0191521 A1 * | 7/2010 | Huet | ........................ | G06F 40/30 704/9 |
| 2016/0283607 A1 * | 9/2016 | Bain | ........................ | G06F 16/84 |

(Continued)

OTHER PUBLICATIONS

William Hersh "Search Still Matters: Information Retrieval in the Era of Generative AI" arXiv:2311.18550, Dec. 17, 2023 (07 Pages).

(Continued)

*Primary Examiner* — Etienne P Leroux

(74) *Attorney, Agent, or Firm* — Mannava & Kang, P.C

(57) ABSTRACT

A technique for generative artificial intelligence-based information retrieval is disclosed. The system receives a natural language query for information to be retrieved from a knowledge base, that includes a structured data source and an unstructured data source. Further, contextual information for the natural language query is extracted from the knowledge base by domain-based chunking and tagging of relevant documents in the unstructured data source, and/or executing an automatically generated Structured Query Language (SQL) query, on the structured data source. Following, the system inputs the contextual information along with the natural language query to at least a Large Language Model (LLM). The system provides an output of the LLM as a response to the natural language query.

19 Claims, 8 Drawing Sheets

(56) References Cited

U.S. PATENT DOCUMENTS

| | | | | |
|---|---|---|---|---|
| 2024/0256553 | A1* | 8/2024 | Macha | G06F 16/24573 |
| 2024/0412058 | A1* | 12/2024 | Mayande | G06F 16/24564 |
| 2025/0252468 | A1* | 8/2025 | Hewlett, Jr. | G06Q 30/04 |
| 2025/0342179 | A1* | 11/2025 | Gangumalla | G06F 16/31 |
| 2025/0348743 | A1* | 11/2025 | Ranjan | G06N 3/091 |
| 2025/0371000 | A1* | 12/2025 | Mitra | G06F 16/24522 |
| 2025/0384072 | A1* | 12/2025 | Bhat | G06F 9/5011 |

OTHER PUBLICATIONS

Sandeep Chavan "Revolutionising Information Retrieval with Generative AI (Text-to-SQL)" Paktolus Engineering, Medium.com, Feb. 1, 2024, (12 Pages).

* cited by examiner

700

| RECEIVE A NATURAL LANGUAGE QUERY | 702 |

| EXTRACT CONTEXTUAL INFORMATION FOR THE NATURAL LANGUAGE QUERY | 704 |

| INPUT THE CONTEXTUAL INFORMATION ALONG WITH THE NATURAL LANGUAGE QUERY TO THE LLM | 706 |

| PROVIDE AN OUTPUT OF THE LLM AS A RESPONSE TO THE NATURAL LANGUAGE QUERY | 708 |

GENERATIVE ARTIFICIAL INTELLIGENCE-BASED INFORMATION RETRIEVAL

TECHNICAL FIELD

Various examples described herein relate generally to generative artificial intelligence (GenAI)-based information retrieval. Specifically, disclosed examples are directed to information retrieval and management of knowledge base using GenAI and machine learning (ML) techniques.

BACKGROUND

In the data-centric environment, effectively leveraging organizational knowledge is paramount for scaling operations and driving growth. A significant impediment to efficient knowledge management is the fragmentation of information across disparate data stores and diverse formats within the enterprise. In this dynamic landscape, organizations must prioritize robust information retrieval and knowledge management strategies to enhance agility and foster innovation.

Information retrieval encompasses the indexing and search capabilities across heterogeneous repositories, providing access to vast data reserves and facilitating knowledge discovery, retrieval, and dissemination throughout the organization. This involves implementing systems that can efficiently navigate the complex data landscape and retrieve relevant information based on specific queries.

Knowledge management focuses on the systematic identification, collection, and sharing of intellectual capital for organizational benefit. This includes establishing processes for capturing and codifying organizational knowledge assets, such as documentation, articles, reports, and expert insights. A centralized knowledge base serves as a foundation for effective knowledge management, enabling the creation, storage, retrieval, and dissemination of organizational knowledge, ultimately enhancing the collective understanding and expertise within the enterprise. This, in turn, facilitates informed decision-making, accelerates problem-solving, and drives innovation.

SUMMARY

Implementations of the present disclosure are generally directed to information retrieval. More particularly, implementations of the present disclosure are directed to information retrieval and knowledge management using generative artificial intelligence (GenAI) and machine learning (ML) techniques.

In general, innovative aspects of the subject matter described herein provide a system and a method for information retrieval and knowledge management using GenAI and machine learning (ML). The system may include one or more hardware processors. The system may further include one or more non-transitory processor-readable medium storing instructions to be executed by the one or more hardware processors. The system may receive a natural language query for information to be retrieved from a knowledge base. Herein, the knowledge base includes a structured data source and an unstructured data source. The system may further, extract contextual information for the natural language query from the knowledge base by one or more of domain-based chunking and tagging of relevant documents in the unstructured data source and executing an automatically generated Structured Query Language (SQL) query on the structured data source. Following, the system may input the contextual information along with the natural language query to a large language model (LLM). The LLM may provide an output as a response to the natural language query.

The present disclosure further describes a method for implementing the method provided herein. The present disclosure also describes non-transitory processor-readable storage medium coupled to one or more hardware processors and having instructions stored thereon which, when executed by the one or more hardware processors, cause the one or more hardware processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the provided aspects and features.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various examples in accordance with the present disclosure will be described with reference to the drawings, in which.

DETAILED DESCRIPTION

Figure 1:
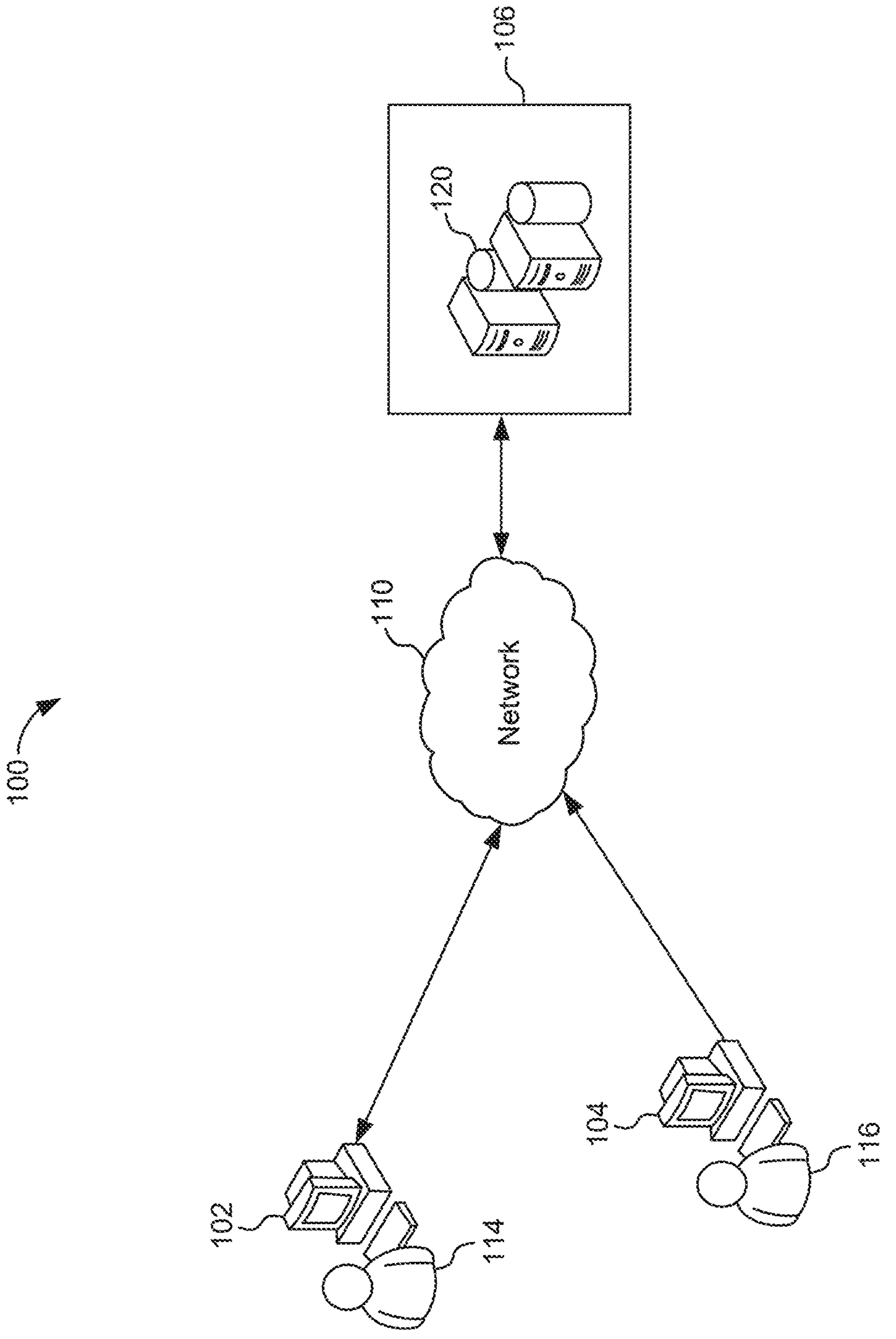
FIG. 1 illustrates an example environment used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring details of the examples.

The specification and drawings are to be regarded in an illustrative rather than a restrictive sense. It will, however, be evident that various modifications and changes may be made thereunto without departing from the broader spirit and scope of the invention as set forth in the claims.

The exponential growth of organizational data, driven by an expanding number of sources, presents a significant challenge in the efficient retrieval of high-quality, actionable knowledge at the point of need. In essence, users require seamless access to relevant information precisely when required. The present disclosure relates to a robust information retrieval and knowledge management system to addresses the challenge by enhancing information findability within the expanding data landscape. The information retrieval and knowledge management system, disclosed in the present disclosure achieves this by retrieving timely and pertinent information from an organization's diverse knowledge repositories, thereby ensuring that users can effectively locate and utilize critical insights for informed decision-making and operational efficiency. This involves implementing sophisticated indexing, search, and retrieval mechanisms capable of navigating the complexities of heterogeneous data sources and delivering precise results.

Traditional information retrieval and knowledge management system poses several technical challenges. For instance, the traditional systems often retrieve inconsistent or outdated information. For example, in a customer service scenario, the system may provide outdated solutions to customers' issues, affecting service quality. Further, in the traditional systems, integrating structured and unstructured data from heterogeneous data sources poses a significant challenge. Manual consolidation of data from systems like customer relationship management (CRM), email, and document repositories is inefficient, error-prone, and often results in incomplete or inaccurate insights, hindering comprehensive analysis. The traditional information retrieval and knowledge management system often utilize keyword-based search methodologies, which frequently return irrelevant results due to their inability to interpret the semantic context and intent behind user queries. The lack of semantic understanding leads to incomplete information retrieval, as synonyms and related concepts are often missed. For example, searching for "affordable phones" may miss results labeled as "budget phones," leading to incomplete information retrieval. Moreover, traditional systems include manual review of documents to extract key or required information. Manually reviewing and extracting key information from lengthy documents is a time-intensive and error-prone process. For instance, legal professionals may spend hours to manually review the contracts to find specific clauses, which could be automated using summarization techniques. The traditional systems lack a unified approach to extract relevant information from diverse data sources.

Further, the traditional systems include manual aggregation of information from sources like emails, social media, and surveys, which can result in overlooking critical insights essential for strategic decisions. Furthermore, the traditional systems lack capabilities for processing and analyzing diverse data formats, for example multi-modal data (text, images, audio, video). The lack of said capabilities hinders comprehensive analysis and limits the potential for extracting valuable insights from rich media content. For instance, a healthcare application may need to analyze patient records, medical images, and audio notes to provide comprehensive diagnostics, which is difficult to achieve without multi-modal data processing capabilities.

Also, the traditional systems often lack the ability to effectively analyze user data, limiting their ability to deliver tailored recommendations and personalized search results. For example, an e-commerce platform may struggle to recommend relevant products to users without analyzing the browsing history, purchase patterns, and preferences. Additionally, the traditional systems often suffer from slow retrieval speeds, leading to reduced productivity. Excessive search times in the traditional systems significantly impact operational efficiency and hinder the ability to access critical information in a timely manner.

Therefore, to address afore-mentioned challenges, there is a need for system and method that can leverage the power of generative artificial intelligence (GenAI) and machine learning (ML) techniques to efficiently process and analyze vast quantities of heterogeneous data. In essence, there is a need of improved system and method capable of delivering highly relevant search results in real time, tailored to specific user context and requirements.

Implementations of the present disclosure discloses a solution, including a system and a method of information retrieval and knowledge management using GenAI and ML techniques to overcome above mentioned technical challenges of the traditional systems. To address the issue of inconsistent information retrieval, the present disclosure integrates knowledge base with the large language models (LLMs). This approach ensures that LLMs access up-to-date and domain-specific information, thereby reducing the risk of outdated or inconsistent responses. By centralizing and regularly updating the knowledge base, the system can provide accurate and reliable information is provided consistently. To overcome the challenge of integrating structured and unstructured data from various sources, a unified data integration is implemented in the present disclosure. The unified data integration may leverage advanced data extraction and transformation techniques to combine data from various sources such as CRM systems, emails, and documents into a single, cohesive system. This ensures that insights are complete and accurate, facilitating better decision-making and analysis.

Also, the proposed solution in the present disclosure, improves search efficiency by utilizing semantic search capabilities powered by vector storage and LLMs. By implementing a vector-based search system, accurate and context-aware results are obtained, thereby ensuring comprehensive information retrieval. While technologies such as LLMs can understand the context and semantics of queries to provide more relevant results, a technical problem exists such that LLMs are limited by the quantum of information that can be processed. Examples are disclosed herein that provide a technical solution to the aforementioned technical problem by categorizing the natural language query which in turn can be used to determine the quantum of context information that can be input to the LLM based on an anticipated size of the response and hence improving the efficiency and accuracy of the LLMs. Moreover, the proposed solution discloses multi-modal data processing, thereby processing different data formats, including text, images, audio, and video. The implementation of technologies such as optical character recognition (OCR) for text extraction from images, speech-to-text for audio data, and video analysis tools may ensure accurate and efficient processing of diverse data types. This comprehensive approach enables efficient diagnostics and insights, particularly in applications like healthcare.

FIG. 1 depicts an example environment 100 that can be used to execute implementations of the present disclosure. In some examples, the example environment 100 enables users associated with respective systems to execute requests to generate content by invoking a trained language model in accordance with implementations of the present disclosure. The example environment 100 includes computing devices 102 and 104, back-end system 106, and a network 110. In some examples, the computing devices 102 and 104 are used by respective users 114 and 116 to log into and interact with the back-end system 106 and applications executing on the back-end system 106 according to implementations of the present disclosure.

As shown in FIG. 1, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites (e.g., web applications executing on the back-end system 106), user devices (e.g., the computing devices 102, 104), and the back-end system 106. In some examples, the network 110 can be accessed over a wired and/or a wireless communications link. For example, mobile computing devices, such as smartphones can utilize a cellular network to access the network 110.

While only one back-end system 106 is shown in FIG. 1, there may be more than one back-end system 106, and each of the back-end systems 106 includes at least one server system 120. In some examples, the server system 120 hosts one or more computer implemented services that users 114 and/or 116 can interact with by using the computing devices 102 and/or 104, respectively. For example, components of enterprise systems and applications can be hosted on one or more of the back-end system 106. In some examples, the back-end system 106 can be provided as an on-premises system that is operated by an enterprise or a third-party taking part in cross-platform interactions and data management. In some examples, the back-end system 106 can be provided as an off-premises system (e.g., cloud or on-demand) that is operated by an enterprise or a third-party on behalf of an enterprise.

In some examples, the computing devices 102 and 104 each include computer executable applications executed thereon. In some examples, the computing devices 102 and 104 each include a web browser application executed thereon, which can be used to display one or more web pages of applications executing on the back-end system 106. In some examples, each of the computing devices 102 and 104 can display one or more GUIs that enable the respective users 114 and 116 to interact with the back-end system 106. In accordance with implementations of the present disclosure, the back-end system 106 may host enterprise applications or systems that require data sharing and data privacy. In some examples, the computing device 102 and/or the computing device 104 can communicate with the back-end system 106 over the network 110.

In some implementations, the back-end system 106 can be implemented in a cloud environment. The back-end system 106 includes at least one server system (or server) 120. In the example of FIG. 1, the back-end system 106 can include various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used for information retrieval and knowledge management. Various examples, depicting information retrieval and knowledge management, are described in detail in conjunctions with figures below.

Figure 2:
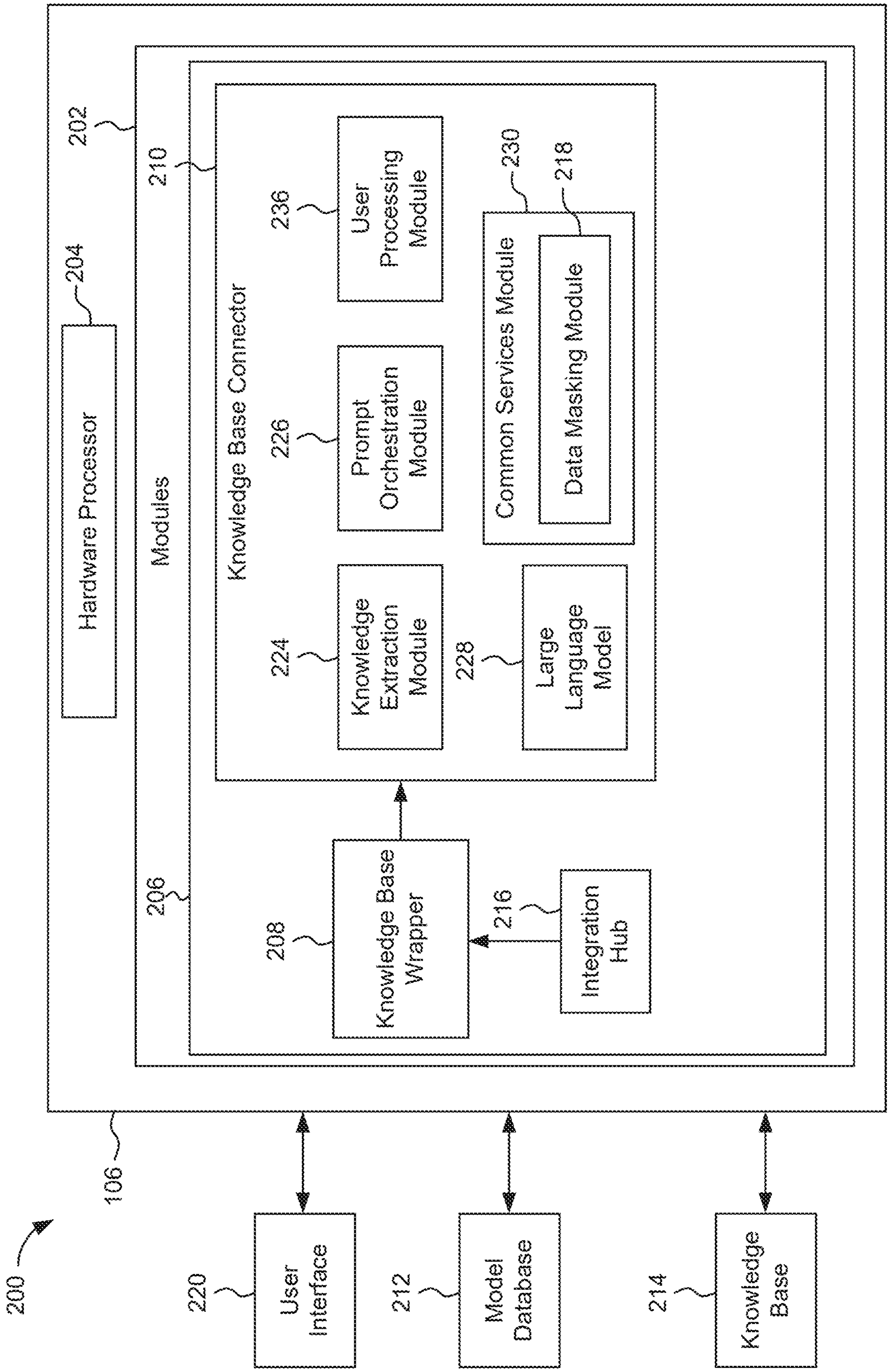
FIG. 2 illustrates an example architecture of the back-end system for information retrieval and knowledge management, in accordance with implementations of the present disclosure.

FIG. 2 illustrates an example architecture 200 of the back-end system 106 for information retrieval and knowledge management, in accordance with implementations of the present disclosure. The back-end system 106 may include one or more non-transitory processor-readable medium (herein referenced as memory) 202 storing instructions to be executed by the one or more hardware processors 204. In the back-end system 106, the one or more hardware processors 204 may be communicably coupled with the one or more memory 202 and configured to execute the machine-executable instructions. In some examples, the one or more hardware processors 204 may include, but not limited to, microprocessors, microcomputers, hardware processors, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the one or more hardware processors 204 may be programmed to cooperate with non-transitory processor-readable instructions stored in one or more memory 202 for performing operations according to the present disclosure. The one or more memory 202 may be non-transitory or non-volatile medium, such as a magnetic disk or solid-state non-volatile memory or volatile medium such as Random Access Memory (RAM), and/or the like.

In some examples, the one or more memory 202 may include modules 206 in the form of programmable instructions executable by the one or more hardware processors 204. The modules 206 may further include a knowledge base wrapper 208, a knowledge base connector 210, and an integration hub 216. The modules 206 may be communicatively coupled to a knowledge base 214.

Further, the back-end system 106 may be communicatively coupled to a model database 212. The model database 212 may include one or more LLMs (also be referenced to as GenAI models, foundation models, natural language processing (NLP) model and/or the like). In an implementation, the LLMs may include pre-trained LLMs or generated LLMs. The pre-trained LLMs may be general-purpose GAI models like large deep learning neural networks, which may be trained using a broad range of generalized and unlabelled training data to perform one or more tasks, such as, human computer interactions (i.e., question and answering), automating process execution, process planning, generating step-by-step procedures for the process execution, performing data analysis, and/or the like. While implementations of the present disclosure are described in further detail herein with non-limiting reference to the LLMs, it is contemplated that implementations of the present disclosure may be realized using any appropriate foundation models or Machine Learning (ML) models, or Artificial Intelligence (AI) models In an aspect, the back-end system 106 may receive a natural language query for information to be retrieved from the knowledge base 214. For example, the natural language query may be submitted by users 114 and 116 via a user interface 220. The natural language query may refer to user's 114 and 116 request for information. It may be appreciated that human users 114 and 116 are shown for illustration purposes only and that 'users' generating natural language queries in accordance with the disclosed examples can also include applications being executed on the computing devices 102 and 104 that automatically generate the natural language queries without intervention from the human users 114 and 116. The natural language query may be a string of text formulated by the user 114 and 116 to express the required information. For instance, the natural language query may range from simple keyword searches phrased in a conversational manner (e.g., "What is the capital of France?") to complex, multi-clause questions requiring nuanced understanding of context and semantics (e.g., "What are the long-term effects of this medication, considering the patient's history of heart disease?"). In addition to text initiated by the users 114 and 118, the natural language query may be implicitly generated from system events or derived from diverse data sources, encompassing textual input, uploaded files, documents, and multimedia content.

Furthermore, the knowledge base 214 may store information for further retrieval and use. The knowledge base 214 may represents a formal representation of information within a specific domain or across domains. Additionally, the knowledge base 214, along with the storage of data, may facilitate the storage of the relationships between data elements. Herein, the knowledge base 214 may include a structured data source and an unstructured data source. The structured data source may include the data organized in a predefined format, such as tables in a relational database, or graph databases with nodes and edges representing entities and relationships, respectively. The data may be characterized by the high degree of organization, making said data to be easily searchable or queried using structured query languages like SQL or graph query languages like Cypher. Non-limiting examples of the structured data source may include product catalogs, customer databases, or knowledge graphs. The unstructured data source may include data that which lacks a predefined format or organization. For example, text documents (e.g., articles, reports, emails), multimedia files (e.g., images, audio, video) web pages, or the like. To process and analyze the data lacking predefined format or organization, may be challenging due to the inherent complexity and lack of structure. Techniques like Natural Language Processing (NLP) may be utilized further for extracting meaningful information from the unstructured data source. In essence, by integrating the structured and unstructured data sources, the knowledge base 214 may facilitate answering natural language queries, providing comprehensive and contextually relevant information to users.

Further, the knowledge base wrapper 208 may be provided for seamless integration with various data sources and applications. The knowledge base wrapper 208 may provide a unified interface for accessing the data. Specifically, the knowledge base wrapper 208 may facilitate the transmission of the natural language query (submitted by the user 114 and 116 via user interface 220) to the knowledge base connector 210 for further processing.

In some examples, the knowledge base connector 210 may further include a knowledge extraction module 224, a prompt orchestration module 226, a large language model (LLM) 228, a user processing module 236 and a common services module 230. The knowledge extraction module 224 may extract contextual information for the natural language query from the knowledge base 214 (the knowledge base 214 may include the structured data source and unstructured data source). The knowledge extraction module 224 may extract contextual information for the natural language query from the unstructured data source by domain-based chunking and tagging of relevant documents. Specifically, the unstructured data source may refer to a source of information including data (or unstructured data) without a predefined format or organization, typically in the form of text, images, audio, or video files. Moreover, the unstructured data may not be arranged according to a preset data model or schema. The information included in the unstructured data source may not be interpreted and analyzed without additional processing (like data cleaning, data labelling, etc.) by the knowledge extraction module 224. The non-limiting examples of the unstructured data source may include e-mails, word documents, images (for example in format JPEG, PNG, or the like), videos (for example in format MP4, AVI, or the like), audio files (for example in format MP3, WAV, or the like). The domain-based chunking may refer to segmenting the unstructured data into meaningful and manageable chunks based on predefined domain-specific rules or patterns.

In an example implementation, the domain-based chunking may facilitate efficient processing, improve accuracy, and preserve the context and semantic meaning of the unstructured data. For example, in medical domain, domain-based chunking may identify sections related to symptoms, diagnoses, treatments, or patient history. The segmentation may isolate relevant portions of the unstructured data which may include contextual information related to the natural language query. The domain-based chunking may leverage techniques like part-of-speech tagging, named entity recognition, and syntactic parsing to identify the segments. Furthermore, the tagging of relevant documents may refer to automatically assigning tags or labels (such as metatags) to documents based on their content and relevance to specific domains or topics. The tags may facilitate efficient filtering and retrieval of relevant documents. The tagging may utilize techniques, such as machine learning models trained on labeled data, to automatically identify and assign the appropriate tags. The extraction of contextual information for the natural query from the unstructured data source, by the knowledge extraction module 224 is explained further in conjunction with FIG. 3.

In an aspect, the knowledge extraction module 224 may apply a Responsible Artificial Intelligence (RAI) filter that identifies one or more of harmful, offensive and inappropriate content in the natural language query. The RAI filter may provide the filtered output as the response to the natural language query. The RAI filters may include content filters, filters for bias detection, and filters for detecting non-compliance with predefined/ethical standards. The non-compliance with ethical standards may include harmful, offensive and inappropriate content.

Further, the knowledge extraction module 224 may extract contextual information for the natural language query from the structured data source by executing an automatically generated Structured Query Language (SQL) query. Specifically, the structured data source may refer to a source of information including data (or structured data) organized in a predefined format, enabling efficient storage, retrieval, and analysis. The organization of structured data may include a pre-defined schema outlining data types, relationships among data elements, and adherence to structural rules. For instance, the structured data may include relations among entities and variables. The entities and variables may be organized as a set of tables with columns and rows. The structured data in the structured data source may be stored in a database object called table. The database may include plurality of tables. Each table may be identified by a unique name and may contains a collection of related data entries structured as rows and columns. The column in the table may be known as fields and may include all information associated with the specific field in the table. Each row in the table may be known as a record. The structured data, presented in rows and columns, may have a consistent schema and data model, as well as clusters grouping similar data. Each data may conform to the schema and data model. The non-limiting examples of the structured data may include relational databases, columnar databases, data warehouses, excel files, SQL databases, web form result and search engine optimization (SEO) tags. For instance, the relational databases may include large amounts of data, such as customer information, sales data, or inventory records, stored in tables with clearly defined relationships established. In an example implementation, the knowledge extraction module 224 may automatically generate SQL queries based on the natural language query. In other words, the knowledge extraction module 224 may translate the natural language query into the formal syntax of SQL. Herein the SQL query may refer to statement or request to retrieve data from the structured data source. In other words, the SQL query may be a standardized language used for interacting with structured data source (for example, relational database management systems (RDBMS)). The SQL query may enable users 114 and 116 to perform various operations, including, but not limited to, retrieving, inserting, updating, and deleting data, as well as managing database schema and access control. SQL queries may be the structured statements that specify the desired data and the operations to be performed on it.

The knowledge extraction module 224 may identify the intent of the natural language query and map the identified intent to the schema of the structured data source. Specifically, the knowledge extraction module 224, to identify the intent, may parse the natural language query, identify elements like, but not limited to, key entities, relationships, and desired information, and thereafter map said elements to the corresponding tables and columns within the schema of structured data source. For instance, if the natural language query is "What were the sales of product Y in Q3 2023?", the knowledge extraction module 224 may generate an SQL query like "SELECT SUM (Sales) FROM SalesTable WHERE Product='Y' AND Quarter='Q3' AND Year=2023". The extraction of contextual information for the natural language query from the structured data source, by the knowledge extraction module 224 is explained further in conjunction with FIG. 4.

Further, the prompt orchestration module 226 may input the contextual information, extracted by the knowledge extraction module 224, along with the natural language query to the LLM 228. The prompt orchestration module 226 may combine the contextual information including structured data from the structured data source and unstructured data from the unstructured data source. The prompt orchestration module 226 may aggregate the structured and unstructured data into a unified structure. In an aspect, the prompt orchestration module 226 may utilize data structure, such as a dictionary or a custom class to represent the combined contextual information. Additionally, the prompt orchestration module 226 may adjust a proportion of the structured data and the unstructured data based on a category of the natural language query selected from one or more of a use-case based type, and an exploratory type. The prompt orchestration module 226 may further selects a prompt template based on the specific domain of the natural language query. The prompt templates may refer to pre-defined structures which guide the LLM's 228 output. The prompt template may include placeholders for the natural language query, the contextual information, and instructions for the LLM 228. Different templates may be used for different types of natural language queries (for example, question answering, summarization, generation, or the like). Furthermore, the contextual information (that is, combined structured and unstructured data) may be formatted based on a prompt template. Thereafter, said formatted contextual information may be input to the LLM 228. Specifically, the prompt orchestration module 226 may formats the aggregated contextual information according to the selected prompt template. The formatting of the contextual information may include, but not limited to, data transformation, data formatting and placeholder substitution. The data transformation may include converting the structured data, by using the SQL query, into string format suitable for inclusion in the prompt. For example, converting tables into comma-separated values or JavaScript Object Notation (JSON) format. Data formatting may include incorporating the unstructured data chunks into the prompt with specific formatting or markup to distinguish them from other parts of the prompt. The placeholder substitution may refer to replacing placeholders in the prompt template with the natural language query and the formatted contextual information. Thereafter, the prompt orchestration module 226 may construct the final prompt by combining the prompt template, the formatted contextual information, and the natural language query. This involves concatenating the different parts of the prompt into a single string. The constructed prompt may be then passed as input to the LLM 228.

In an example, the natural language query submitted by the user 114 and 116 is "What are the side effects of drug X?". The knowledge extraction module 224 may execute the SQL query and retrieve data about drug X's chemical composition and clinical trial results. Additionally, the knowledge extraction module 224 may retrieve relevant chunks from medical documents, including information about observed side effects. The prompt orchestration module 226 may select the prompt template expressed as below:

Answer the following question based on the provided context:
Question: {user_query}
Context:
Chemical Composition: {chemical_composition}
Clinical Trial Results: {clinical_trial_results}
Observed Side Effects: {side_effects}

Thereafter, the prompt orchestration module 226 may format the structured and unstructured data. Specifically, the structured data about chemical composition may be converted into a string (for example, "Drug X contains compound A, compound B, and compound C.") to format said structured and unstructured data. Similarly, the clinical trial data may be formatted into a readable string. The unstructured data chunks about side effects may be included, with formatting to highlight the side effects. Consequently, the prompt orchestration module 226 may constructs the final prompt by substituting the placeholders, expressed as below:

Answer the following question based on the provided context:
Question: What are the side effects of drug X?
Context:
Chemical Composition: Drug X contains compound A, compound B, and compound C.
Clinical Trial Results: . . . (clinical trial data) . . . . Observed Side Effects: In some patients, drug X has been observed to cause nausea, headaches, and dizziness . . . (more side effect information) . . . .

This final prompt, along with both structured and unstructured contextual information, may be then sent to the LLM 228 for processing, enabling the LLM 228 to generate a more informed and comprehensive response.

In another aspect, the prompt orchestration module 226, to input the contextual information into the LLM 228, may determine a quantum of contextual information to be input to the LLM 228 based on the type of the natural language query. In other words, the prompt orchestration module 226 may manage the quantum (amount) of contextual information input to the LLM 228, thereby, optimizing for both relevance and efficiency. The quantum of contextual information to be input to the LLM 228 may be determined based on corresponding percentages of the contextual information extracted from the structured data source and the unstructured data source.

The prompt orchestration module 226 may first analyze the natural language query to determine the type. The type of the natural language query may include classifying said natural language query in different categories such as, question, command, request for summarization, or other categories. Moreover, the type of the natural language query may be determined by using techniques like keyword analysis, pattern matching, or machine learning (ML)-based classification models. The ML based classification models (for example, Support Vector Machines, Naive Bayes, or deep learning models) may be trained on labeled natural language query data to classify natural language query in different categories. Different categories of the natural language query types may require different levels and types of contextual information. Based on the determined type of the natural language query, the prompt orchestration module 226 may determine the appropriate quantum of contextual information to be input into the LLM 228.

Additionally, the prompt orchestration module 226 may implement dynamic approach to determine the quantum of input context information provided to the LLM 228, thereby optimizing LLM 228 performance and ensuring the generation of accurate and relevant responses. The dynamic approach may include determining the quantum based on the volume of the extracted contextual information and the anticipated size and complexity of the LLM's 228 response. For instance, in case the natural language query requiring factual answers or basic trend analysis (for example, "What were the revenue growth trends in Q3?"), the prompt orchestration module 226 may provide a smaller quantum of context. The smaller quantum may include relevant financial metrics from the structured data source (for example RDBMS). In another instance, in case of intricate natural language queries, demanding in-depth analysis and synthesis (for example, "Provide a detailed market insights report on the impact of regulatory changes on industry X"), the prompt orchestration module 226 may provide a larger quantum of context. The larger quantum may include combination of relevant financial data, market analysis reports, and industry news. The prompt orchestration module 226 may adjusts the proportion structured and unstructured data based on the natural language query's characteristics. For example, the natural language query related to financial analysis may prioritize structured data, while the natural language query related to market trends may prioritize unstructured data.

Moreover, to determine the quantum, the prompt orchestration module 226 may utilize predefined or dynamically calculated percentages to control the relative amounts of structured and unstructured data. The predefined percentages may be based on empirical data or domain expertise, reflecting the contextual information requirements for different types of natural language query. Moreover, the percentage may be determined by analyzing the relevance scores or confidence levels associated with the extracted contextual information. The prompt orchestration module 226 may utilize techniques like Term Frequency-Inverse Document Frequency (TF-IDF), Best Match (BM25), or embedding similarity to score the relevance of extracted contextual information. For example, if the structured data has high confidence scores, a larger percentage of structured data may be included. The prompt orchestration module 226 may implement keyword matching by counting the occurrences of keywords from the user's query within the extracted contextual information. In an instance, by using TF-IDF, prompt orchestration module 226 may identify the significance of words in the context relative to a corpus of documents in the structured and unstructured data source, highlighting unique and relevant terms. Techniques such as word embeddings (e.g., Word2Vec, GloVe, or transformer-based embeddings like BERT), may be utilized to calculate the semantic similarity between the natural language query and the contextual information, thereby capturing the semantic meaning. The prompt orchestration module 226 may, by using techniques such as NER, identify entities (e.g. people, places, organizations) and verify if the identified entities align with the natural language query's entities. Moreover, the prompt orchestration module 226 may parse the contextual information to determine grammatical relationships and dependencies, leading to identify relevancy of the contextual information to the natural language query's structure. To score the relevance of extracted contextual information may apply scoring model, for example rule-based or machine learning (ML), to the features in the extracted contextual information. The rule-based scoring model may include defining a set of rules and weights for each feature. For example, the keyword match may receive a certain score, and semantic similarity may receive a higher score. Further, the ML model may include, but not limited to, classification models, ranking models and semantic similarity models. The classification model may include training model (e.g., logistic regression, support vector machine, or transformer-based models) to predict the relevance of the contextual information for given natural language query. The training data may include of natural language query-context pairs labeled as relevant or irrelevant. The ranking models may include using models specifically developed for ranking, such as learning-to-rank techniques. The ranking models may learn to order contexts based on the relevance to the given natural language query. The semantic similarity models may include utilizing transformer models fine-tuned to determine the similarity between two pieces of text. The semantic similarity models may output score representing the degree of similarity.

In some examples, the contextual information including the structured data (financial metrics) may be input to the LLM 228 in a structured format. Additionally, the unstructured data, like market analysis reports, may be pre-processed to extract relevant information and convert it into the structured format, such as JSON. The combined structured context is then may be input into the LLM 228 to generate the accurate and relevant response. For example, the JSON input may be expressed as below:

```
{
  "financialData": {
    "companyName": "Company A",
    "projectedRevenue": "10M",
    "revenueGrowthPercentage": "15%"
  },
  "marketInsights": [
    {
      "date": "2025-02-01",
      "insight": "Private equity is anticipated to offer the
greatest ROI over the next three years."
    },
    {
      "date": "2025-02-02",
      "insight": "Data centers and residential/build-to-rent
property are top asset classes within the real estate sector."
    }
  ]
}
```

In another example, the type of the natural language query may be classified as "complex analytical question". The prompt orchestration module 226 may determine that a larger quantum of contextual information is needed, for example, with a 60% emphasis on unstructured data (clinical trials, research papers) and 40% on structured data (drug composition, dosage). Further, the prompt orchestration module 226 may select the relevant clinical trial results and research papers based on relevance scores and extracts key data points from the drug composition and dosage tables. The prompt orchestration module 226 may constructs the final prompt including summaries of the selected documents, the extracted percentage of structured and unstructured data, and the natural language query. The constructed final prompt may be input to the LLM 228 for further processing. In essence, by dynamically adjusting the quantum of contextual information based on query type and data relevance, the prompt orchestration module 226 may optimize the LLM's 228 capability, enabling the LLM 228 to generate accurate and informative responses.

Further, the user processing module 236 may process the natural language query to extract contextual information from the structured data source and the unstructured data source. The processing the natural language query to extract contextual information from the structured data source is explained further in conjunction with FIG. 5 and processing the natural language query to extract contextual information from the unstructured data source is explained further in conjunction with FIG. 6.

The LLM 228 may receive the contextual information along with the natural language query from the prompt orchestration module 226. The LLM 228 may provide an output as a response to the natural language query. The output of the LLM 228 may include plurality of data formats and representations, tailored to the specific nature of the natural language query and the extracted contextual information. The output of the LLM 228 may include, but not limited to metric data, tabular data including rows and columns, chart data, and summary. The metric data may refer to numerical values representing measurements or calculations. The non-limiting examples may include revenue figures, performance metrics, or statistical summaries. The metric data may be provided as the response to quantitative questions or provide specific performance indicators. The tabular data including rows and columns may refer to the structured data presented in the tabular format, like a spreadsheet or database table. The tabular data may be utilized for presenting organized data, such as product comparisons, financial reports, or customer demographics. The chart data may refer to data formatted for visualization as charts or graphs. The chart data may be utilized in the representation of trends, comparisons, or distributions. The LLM 228 may provide the chart data as output in formats like JSON or CSV, suitable for rendering by charting libraries. The charting libraries (for example, D3.js, Chart.js, Plotly) may be utilized to render chart data provided by the LLM 228 as response. The summary may refer to concise and informative summaries of information, such as documents, reports, or articles. The summaries may be utilized for providing an overview of key findings or insights. The data format may be determined based on the nature of the natural language query and the contextual information. The LLM 228 may implement parsing techniques to determine the data formats of the output response.

Moreover, data transformation techniques may be utilized to convert the LLM's 228 output into specific formats required. For instance, if the natural language query requires numerical answers or performance metrics as response, the LLM 228 may provide metric data or tabular data as the response. If the natural language query includes comparing different entities or data points, the LLM 228 may provide tabular data or chart data as the response. If the natural language query relates to generating summary of a document or report, the LLM 228 may provide summary as the response. The LLM 228 may format the output response using markup languages like Markdown or HTML to enhance readability and presentation, thereby, including headings, lists, tables, and other formatting elements.

In further detail, the back-end system 106 may implement knowledge management of retrieved information, by using LLM 228. After retrieval, Responsible Artificial Intelligence (RAI) filter may be utilized to analyze the information for identifying potential biases, toxicity, or misinformation. The identified potential biases, toxicity, or misinformation may may be flagged, redacted, or undergo further scrutiny before being displayed on the user interface 220, thereby, ensuring ethical and safe knowledge dissemination. Moreover, the integration hub 216 may be implemented as a central point for managing data flow between various components of the back-end system 106. The common services module 230 may implement a request logging mechanism for logging every natural language query and the corresponding response generated from the LLM 228, thereby, providing an audit trail for tracking information flow, identifying potential security breaches, and analyzing user behavior. Furthermore, sensitive information (for example, PII, financial data, etc.) within the retrieved information may be masked before being displayed on the user interface 220 or stored in the knowledge base 214.

In an aspect, the common services module 230 may receive the output of the LLM 228 and apply the RAI filter to said output of the LLM 228. The RAI filter may provide the filtered output as the response to the natural language query. The RAI filters may include content filters, filters for bias detection, and filters for detecting non-compliance with ethical standards to be applied to the LLM 228. The non-compliance with ethical standards may include harmful, offensive and inappropriate content. Specifically, the RAI filters may be applied to the input prompt to the LLM 228 (constructed by the prompt orchestration module 226) and the generated outputs of LLM 228, through classification models to detect and block harmful or offensive content. The harmful or offensive content may include categories like hate speech, violence, sexual content, and self-harm. By applying filters, the common services module 230 may ensure that the response generated by the LLM 228 as the output, is safe and appropriate. Further, the filters facilitate the identification and reduction of biases in the LLM's 228 outputs, thereby, ensuring that the generated response is fair and non-discriminatory. By addressing biases, the filters may promote inclusivity and ethical standards. The filters provide transparency in the decision-making process of the LLM 228.

In further detail, the content filter may utilize classification models to detect and block harmful, offensive content and/or inappropriate content. The harmful, offensive content and/or inappropriate content may include but not limited to profanity, threat, toxicity, personally identifiable information (PII) in data, data leakage, refusal, injection and hallucination. The classification model may utilize natural language processing (NLP) techniques, such as tokenization, embedding generation, and classification techniques (for example, Support Vector Machines, deep learning models), to identify and categorize offensive content. Moreover, the classification model may implement regular expressions to detect specific patterns or keywords associated with harmful content. The regular expressions may include predefined lists of words or phrases. The filters for bias detection may identify and mitigate biases in the LLM's 228 output. The bias detection filter may measure biases in the LLM's 228 output based on the metrics like demographic parity, equal opportunity, or disparate impact, by utilizing the ML models. The ML models may be trained to detect biases based on sensitive attributes (for example, gender, race, religion). Further, said training of ML models may include applying techniques like counterfactual data augmentation or adversarial training to reduce biases in the LLM's 228 output. The filters for detecting non-compliance with ethical standards may ensure that the LLM's 228 output adheres to ethical standards and regulatory requirements. The ethical standards and regulatory requirements may include policy enforcement, knowledge base integration and rule-based systems. The policy enforcement may include implementing rules and policies to prevent the generation of content that violates ethical guidelines or legal regulations. The knowledge base integration may include integrating external knowledge bases or ontologies to identify potential ethical violations. The rule-based systems may detect specific patterns or behaviors that violate ethical standards.

Furthermore, the integration hub 216 may receive all the interactions with the LLM 228 (that is input prompts into the LLM 228 and responses from the LLM 228) track the number of flagged input prompts into the LLM 228 and responses and the types of content violations such as hate speech, violence, and sexual content. The flagged input prompts into the LLM 228 and responses may be further displayed on the user interface 220, thereby, enabling users to understand the reason of blocked generated outputs.

In an aspect, the common services module 230 may implement the request logging mechanism to record and track user 114 and 116 interactions with the back-end system 106. Herein, the request may be raised by the user 114 and 116 to interact with the back-end system 106, by submitting the natural language query via user interface 220. The common services module 230 may identify and store key details about each natural language query processed by the back-end system 106. The common services module 230 may add the natural language query issued to a log of issued requests. The log may create a persistent record of each incoming natural language query and serve as an audit trail, thereby providing valuable insights into back-end system 106 usage and performance. The log may include, but not limited to, a time of a request including the natural language query, a type of the request, resources accessed, and a user or an application making the request, a response time and computational resources used. The time of the request may refer to precise time the request was received. The time of the request may be recorded in coordinated universal time (UTC) for consistency. The time of the request may enable chronological analysis of requests. The type of the request may refer to classification of the request, such as "search," "query," "command," or "data retrieval." The type of the request may categorize and analyze different types of natural language query. Accessing resources may refer to the back-end system 106 resources accessed during natural language query processing, for example, LLM model, database tables, files, application programming interfaces (APIs), or other data sources. The user or the application making the request may include user ID, application name, or API key, etc., for facilitating user-specific or application-specific analysis. The response time may refer to the time taken to process the request and generate the response (for example, measured in milliseconds or seconds). The computational resources may refer the back-end system 106 resources consumed during natural language query processing, such as central processing unit (CPU) usage, memory usage, and disk I/O. The information of computational resources used may facilitate resource utilization analysis and capacity planning. Moreover, the log may store the details of the time of a request including the natural language query, the type of the request, resources accessed, and the user or an application making the request, the response time and computational resources used, in a storage system, such as, database, log files and centralized logging systems.

Furthermore, the common services module 230 may determine from the log of issued requests, a number of tokens processed by the LLM 228 for a user account issuing the natural language query. The common services module 230 may further select the LLM 228 from a plurality of LLMs (in the model database 212) based on the number of processed tokens, via a rules engine. Specifically, the tokens may refer to the units used to measure the amount of text the LLM 228 may processes. The tokens may be generated by splitting a large text corpus (herein, the natural language query) into smaller bits, by using tokenization techniques, such as, word tokenization (text is split into individual words based), character tokenization (text is split into individual characters) and/or subword tokenization (text is split into partial words or character sets). The tokens may include, but not limited to, words, character sets, or combinations of words and punctuation. The size of the LLM 228 may be defined by the number of input tokens the LLM 228 can accept. The common services module 230 may segment the natural language query into individual tokens. Thereafter, the number of tokens in the natural language query may be calculated. The log entry for the issued request may be augmented to include the total number of tokens processed by the LLM 228 for the request. The log entry may be associated with the user account which issued the natural language query, by using, for example, a user ID or session ID. The log entries, including the token counts, may be stored in the storage system (for example database, log files, etc.). The common services module 230 may periodically aggregate the token counts from the log entries, grouped by user account. The aggregated token usage data may be stored in a separate data structure or database table, allowing for efficient retrieval of token usage per user account. Token usage can be tracked over different time windows (e.g., daily, weekly, monthly) to implement usage limits or quotas.

Moreover, the common services module 230 may utilize the rules engine (e.g., Drools, Jess) to define the criteria for LLM selection based on the number of processed tokens. The rules may be defined based on factors such as token usage thresholds (different LLMs may have different token usage limits or pricing tiers), performance requirements (some LLMs may be more suitable for high-volume or low-latency applications) and cost optimization (the rules can be designed to minimize costs by selecting the most cost-effective LLM for the given token usage). When a new request (natural language query) is received, the rules engine may evaluate the rules based on the user's token usage. The rules engine may select the appropriate LLM from a plurality of LLMs (stored in the model database 212) based on the evaluated rules. The LLM selection may be dynamic, meaning that the LLM used for the request may change based on the user's current token usage.

In an example, the maximum token limit of LLM1, LLM 2 and LLM 3 (in the model database 212) may be 10,000, 100,000 and unlimited, respectively. The toke usage of user 114 or 116 is 8,000 tokens for the current day. The rules engine may evaluate the rules and determine that LLM-1 is sufficient for user 114 or 116 current token usage. Thus, LLM-1 may be selected to process request of user 114 or 116.

In another aspect, the common services module 230 may include a data masking module 218. Data masking may refer to a method of protecting sensitive data by replacing the original value with a fictitious but realistic equivalent. The data masking may include, but not limited to, data anonymization, pseudonymization, redaction, scrubbing, or de-identification. The data masking may protect the sensitive data in non-production environments such as development and testing. The data masking may include identifying sensitive information within the data, selecting appropriate masking techniques based on the data type, implementing the selected masking method to replace sensitive values with randomized or generic substitutes while maintaining data integrity, and finally, validating the masked data to ensure the LLM output the desired response.

The data masking module 218 may scan all the data which may be input into the LLM 228 and identify potential sensitive information like personally identifiable information (PII), financial data, health records, and any other confidential information (for example, names, addresses, phone numbers, financial details, medical records, etc,). Further, the data masking module 218 may define data masking policies. The data masking policies may include the rules and criteria for controlling how sensitive information may be protected and presented to different user levels based on the authorization. Specifically, the data masking policy may identify the data elements need to be masked, select the masking method to be used (like (e.g., character substitution, redaction, pseudonymization, hashing etc), and define access to the unmasked data.

Thereafter, the data masking module 218 may apply the selected masking techniques to the identified sensitive data. For example, the data masking module 218 may replace certain characters in a credit card number with asterisks (e.g., 1234 - - - 5678) or use encryption to protect the data during transmission. Moreover, the data masking module 218 may validate the masked data to ensure the masked data remains structurally consistent and retains the necessary information for the LLM 228 to perform the intended task. Moreover, the data masking module 218 may regularly review data masking policies and update the masking policies and techniques as needed to address new security threats and changes in data requirements.

Figure 3:
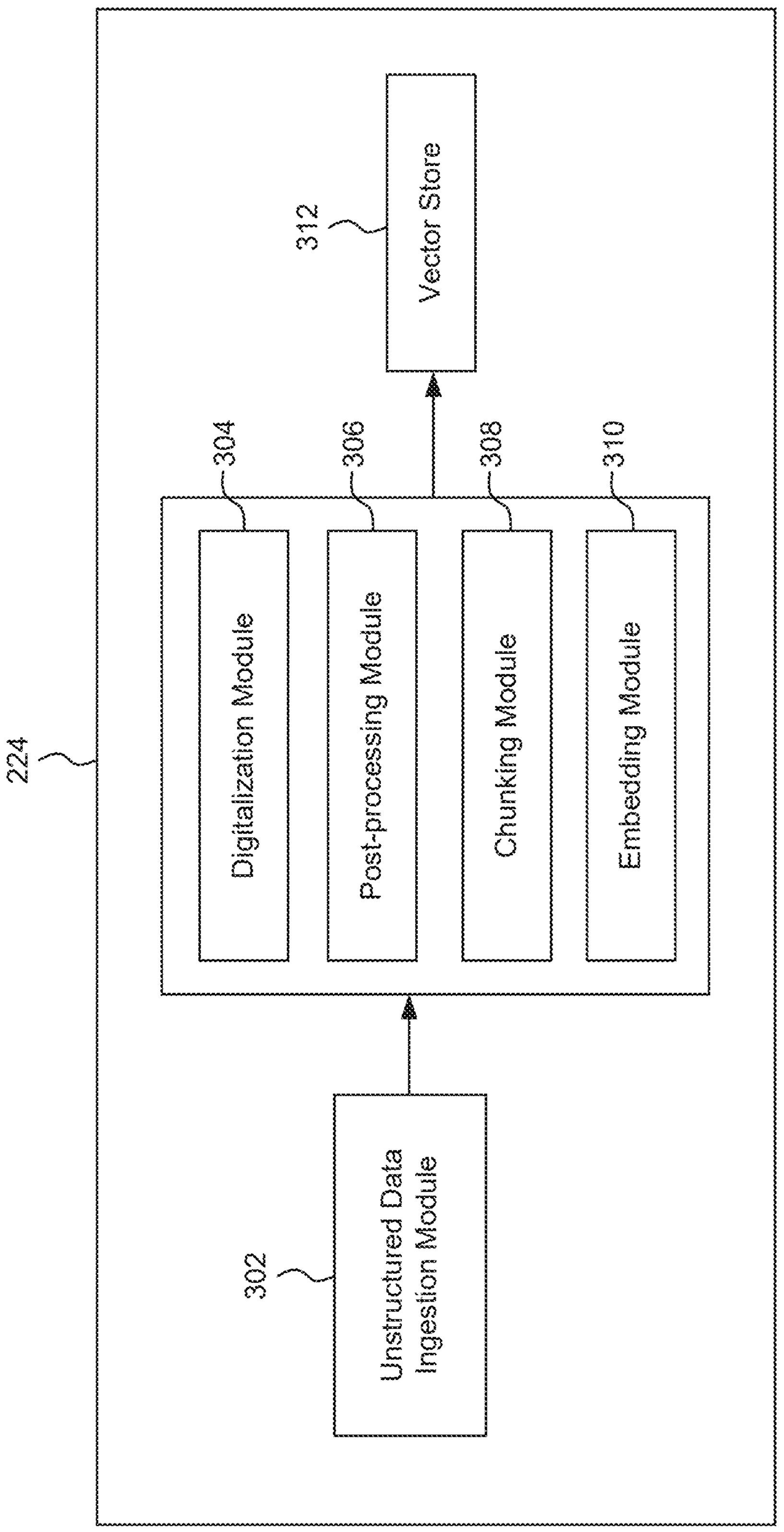
FIG. 3 illustrate a block diagram representation for retrieving an unstructured data from an unstructured data source, by a knowledge extraction module, in accordance with implementations of the present disclosure.

FIG. 3 illustrate a block diagram representation for retrieving the unstructured data from the unstructured data sources, by the knowledge extraction module 224, in accordance with implementations of the present disclosure. The knowledge extraction module 224 may further include an unstructured data ingestion module 302, a digitalization module 304, a post-processing module 306, a chunking module 308, an embedding module 310 and a vector store 312. The unstructured data ingestion module 302 may retrieve the unstructured data from the unstructured data source (in the knowledge base 214). In an aspect, the unstructured data may include documents such as digitized and non-digitized documents. The retrieved documents by the unstructured data ingestion module 302 may be transmitted to the digitalization module 304. The digitalization module 304 may transform the non-digitized documents into machine-readable digital formats, enabling the integration of non-digitized documents into knowledge base connector 210. The digitalization module 304 may utilize techniques such as optical character recognition (OCR), to transform the non-digitized documents into machine-readable digital formats. For example, the digitalization module 304 may utilize OCR to convert image-based text (in the non-digitized document) into searchable and editable text. The non-limiting examples of the non-digitized documents may include documents scanned as images (e.g., JPEG, PNG, TIFF), or image-based PDFs where text is embedded as raster graphics rather than actual text characters. The digitalization module 304 may pre-process the non-digitized documents. The pre-processing may include noise reduction, binarization, de-skewing, contrast adjustment and resolution enhancement. The noise reduction may include applying filters to remove noise and artifacts from the non-digitized documents, thereby, improving text clarity. The binarization may include converting the non-digitized documents to greyscale, thereby simplifying the non-digitized documents and improving contrast between text and background. De-skewing may include correcting/modifying any skew or rotation in the non-digitized documents to ensure text lines are horizontal. The contrast adjustment may optimize the contrast between text and background to improve character recognition. The resolution enhancement may include upscaling the resolution of the non-digitized documents to improve text clarity.

Further, the digitalization module 304, by utilizing the OCR technique, may analyze the preprocessed non-digitized documents and identify the text characters. Specifically, the OCR technique may include, but not limited to, character segmentation, feature extraction and character recognition. The character segmentation may include identifying and isolating individual characters in the preprocessed non-digitized documents. The feature extraction may include extracting features from each character, such as shape, size, and stroke patterns. The character recognition may include comparing the extracted features with a database of known characters to identify the most likely character match. The extracted features may be compared by one or more of template matching, feature-based recognition and contextual analysis. The template matching may include comparing character features with predefined templates. The feature-based recognition may include utilizing the ML models trained on character features. The contextual analysis may include utilizing language models and dictionaries to improve accuracy by considering the context of the characters. After analyzing the preprocessed non-digitized documents by utilizing the OCR technique, the digitalization module 304 may generate text output, which may further be formatted and stored in the digital formats. The digital format may include, but not limited to, text-searchable PDF, plain text (TXT), rich text format (RTF) and word document (DOCX). In the text-searchable PDF, the digitalization module 304 may generate generated text which may be embedded as a text layer in the PDF, making the document searchable and selectable. The plain text (TXT) may refer to text stored in a plain text file, preserving the character encoding. The RTF may refer to the text stored in rich text format, which may preserve basic formatting like fonts and styles.

On the completion of digitalization of non-digitized documents, by utilizing the OCR technique, the digitalization module 304 may transmit the digitalized documents to the post-processing module 306. The post-processing module 306 may implement post-processing steps including, but not limited to, spell checking, grammar checking, layout reconstruction and metadata extraction. Specifically, the spell checking may include identifying and correcting spelling errors. The post-processing module 306 may utilize dictionaries or language models to identify and correct spelling errors. Further, libraries like pyspellchecker (Python) or Hunspell may implemented for spell checking. The post-processing module 306 may tokenize the recognized text, compare each token with entries in the dictionary, and recommend corrections utilizing techniques such as edit distance or phonetic similarity. The grammar checking may include identifying and correcting grammatical errors. The post-processing module 306 may utilize grammar checking libraries (e.g., language_tool_python based on LanguageTool) or cloud-based NLP services to identify and correct grammatical errors. The post-processing module 306 parses sentences, identifies grammatical structures, and detects errors based on predefined rules or statistical models. The layout reconstruction may include reconstructing the original layout of the document, including tables, columns, and images. The post-processing module 306 may utilize image analysis techniques and layout detection techniques to reconstruct the original layout of the document to identify columns, tables, images, and other layout elements. The post-processing module 306 may identify different zones in the image (e.g., text blocks, images, tables). Moreover, the post-processing module 306 may detect table structures and extract data. Additionally, the post-processing module 306 may placing images in the correct positions relative to the text. The metadata extraction may include extracting metadata from the document, for example, title, author, and date. The post-processing module 306 may utilize NLP techniques, such as named entity recognition (NER) to identifying named entities like author names, dates, and locations. Keywords and phrases which represent the document's content may be identified using keyword extraction techniques.

After implementing the post-processing steps, the post-processing module 306 may transmit the documents to the chunking module 308. The chunking module 308 may create chunks from the relevant documents based on the type of the natural language query. The chunking module 308 may implement the domain-based chunking of the data (for instance, text) extracted by the post-processing module 306. Specifically, the chunking module 308 may implement the domain-based chunking by utilizing techniques such as structure-aware chunking and metadata-driven chunking. The structure-aware chunking may include creating chunks from the relevant documents based on document structures. Creating chunks from relevant documents based on document structures may include segmenting the document content into meaningful units aligning with the document's inherent hierarchical or organizational layout. The structure-aware chunking may identify structural elements like headings, sections, paragraphs, lists, and tables and define chunk boundaries, resulting in contextually coherent and manageable segments of information.

The structure-aware chunking may parse the document to identify structural elements like titles, sections, chapters, paragraphs, lists, and tables. Parsing libraries like Beautiful Soup (for HTML/XML), PDFMiner (for PDFs), or domain-specific parsers may be used to identify said structural elements. Thereafter, chunk boundaries may be defined based on the structural elements. In the chunking process, the chunk boundaries may refer to the points within a larger text where one chunk ends and the next begins, essentially marking the dividing lines between the smaller, manageable segments created by splitting the text. The chunk boundaries may be determined based on various factors like sentence endings, paragraph breaks, or semantic shifts. Furthermore, the chunking logic may be applied to define chunk boundaries based on specific structural elements. The chunking logic may include, but not limited to, heading-based chunking, section-based chunking, paragraph-based chunking, list-based chunking and table-based chunking. The heading-based chunking may include creating chunks based on heading levels. For example, each section under a top-level heading may be a separate chunk. The heading-based chunking may be used for dividing documents into logical sections. In the section-based chunking, if the document has explicitly defined sections, each section can be a separate chunk. The paragraph-based chunking may include creating chunks based on paragraphs. The paragraph-based chunking may be utilized for breaking down long sections into smaller, more manageable units. In the list-based chunking, each list item may be considered as a separate chunk. In the table-based chunking each table row or cell may be considered as a separate chunk. The table-based chunking may be utilized for extracting structured data from tables. Additionally, chunking logic may include defining custom rules, by the chunking module 308, based on specific document structures or domain-specific requirements.

Moreover, the metadata-driven chunking may enrich chunks with domain-specific metadata, thereby, providing valuable context for information retrieval. Specifically, the chunking module 308 may attach domain-specific metadata to chunks of the relevant documents to execute the tagging of the relevant documents. The domain-specific metadata may be extracted using models such as named entity recognition (NER) models trained on domain-specific data, rule-based systems, or knowledge bases. The extracted metadata may be thereafter, associated with the corresponding chunks. The extracted metadate may be stored in a key-value format or as part of a document index. Additionally, metadata tags may be attached to each chunk, describing the content and relevance within the domain. Herein, the metadata tags may refer to additional information attached to the chunk which may describe the context, content, or origin, thereby enabling better organization, search, and retrieval of information within larger document or dataset. In other words, the metadata tag may serve as labels or keywords which may categorize and identify the specific meaning of each chunk. In an instance, the chunking module 308 may splits HTML and markdown files based on headers and sections, to create chunks. The chunks may be then tagged with metadata specifying their headers and sub-sections, aiding in content organization. In another instance, in the document related to legal domain, the metadata may include case names, section numbers, citations, legal entities, or court jurisdiction. The chunk containing information about a specific legal case would be tagged with the case name and relevant citations.

In an example, the chunking module 308 may create chunks of a legal document, at section-level boundaries using structure-aware chunking, thereby, ensuring that each section of the XYZ Act is treated as a separate chunk. Each chunk may be tagged with metadata, including the section number and the Act name. The chunk containing "Section 53" would be tagged with "Section 53" and "XYZ Act". When the user 114 and 116 submits the natural language query, the chunking module 308 may first identifies the relevant Act ("XYZ Act") and then retrieves the chunk tagged with "Section 53". Thus, the user 114 and 116 may be presented with the precise information.

In an aspect, the chunking module 308 may implement dynamic chunking strategies to optimize the relevance and contextuality of retrieved information based on the nature of the natural language query. The dynamic chunking strategies may include tailoring the granularity of chunks to the specific natural language query type, thereby ensuring that the LLM 228 may receive the most appropriate contextual information. The chunking module 308 may classifying the natural language query into categories, including, but not limited to, use-case based type and exploratory type. The use-case based type of natural language query may be focused and seek precise responses to well-defined questions. For examples, "What is the capital of France?" or "How do I reset my password?". The exploratory type of natural language query may be broader and aim to explore a topic or gather general information. For example, "Tell me about the history of artificial intelligence" or "What are the current trends in renewable energy?". Additionally, the chunking module 308 may classifying the natural language query into the category of follow-up queries. The follow-up queries may be based upon previous interactions and seek to clarify or expand upon information already provided. For example, "What were the specific instructions?" or "Can you elaborate on that point?".

Based on the classified natural language query category, the chunking module 308 dynamically adjusts the granularity of the generated chunks. Specifically, the chunking module 308 may create fine-grained chunks when the natural language query is of the use-case based type and create larger, context-preserving chunks when the natural language query is of the exploratory type. The chunking module 308, for creating the fine-grained chunks, may break down relevant documents into smaller, highly focused units of information to facilitate the generation of concise and direct responses from the LLM 228. Moreover, the chunking module 308, for creating larger, context-preserving chunks, may segment the document into logical sections, chapters, or larger paragraphs which may provide a comprehensive overview of the topic. Further, the chunking module 308, for creating larger, context-preserving chunks may include segmenting the document based on headings, subheadings, or semantic boundaries. The headings, subheadings, or semantic boundaries may be identified by using NLP techniques, such as semantic role labeling or dependency parsing. For follow-up queries, the chunking module 308 may generates overlapping chunks which may provide continuity with previous interactions. The overlapping chunks may include information from the previous interaction within the current chunk to ensure that the LLM 228 may have the access to the relevant context.

In an example, for the natural language query "How do I reset my password?", the chunking module 308 may classify said natural language query as "specific type". The chunking module 308 may generates fine-grained chunks, expressed as chunk 1 and chunk 2 below, that provide step-by-step instructions:

Chunk 1: "Click on 'Forgot Password' on the login page."

Chunk 2: "Follow the instructions sent to your registered email."

Furthermore, the created chunks from the chunking module 308 may be transmitted to the embedding module 310. The embedding module 310 may convert the chunks into numerical vectors (embeddings) which capture the semantic meaning of the data in the chunks. The generated embeddings may be stored in a vector store 312. In the vector store 312, the embedding may be indexed for efficient retrieval during search queries. Specifically, each created chunk may be divided into smaller units called tokens (e.g. words, subwords, or characters), by using libraries like NLTK or spaCy. For example, "The quick brown fox" may be divided as "The", "quick", "brown", "fox". The embedding module 310 may implement normalization, including, but not limited to, lowercasing (converting all text to lowercase), removing punctuation and special characters, stemming or lemmatization (reducing words to their root form (e.g., "running" to "run")) and removing stop words (commonly used words not contributing to semantics). Following, the embedding module 310 may create a vocabulary (a set of unique tokens). The vocabulary may be used to map tokens to numerical indices. Thereafter, embedding module 310 may utilize embedding models to generate embeddings. Specifically, word embedding models such as, Word2Vec (CBOW or Skip-gram) and Glo Ve (Global Vectors for Word Representation), may be utilized to generate embedding for each word in the vocabulary. Additionally, transformer based embedding models, such as BERT (Bidirectional Encoder Representations from Transformers) and Sentence-BERT (SBERT), may be utilized to generate embeddings for entire sentences or paragraphs. In case of utilizing word embedding module, each token in the chunk may be looked up in the embedding model's vocabulary and the corresponding vector (embedding) for each token may be retrieved. The vectors are then may be aggregated (e.g., averaged) to create a single vector representing the entire chunk. In case of utilizing transformer based embedding models, created chunk may be input into the transformer based embedding model. The transformer based embedding model may utilize the special classification token ([CLS]) embedding for sentence embedding. The transformer based embedding model may average the output embeddings of all of the tokens within the chunk. Furthermore, the generated embeddings may undergo normalization (for instance by using L2 normalization), thereby, ensuring all embeddings are in a similar scale.

Furthermore, the vector store 312 (for example, Pinecone, Milvus, Elasticsearch, Weaviate, and PostgreSQL with pgvector extension) may create indexes, by utilizing indexing techniques, such as approximate nearest neighbors (ANN), hierarchical navigable small worlds (HNSW) and product quantization (PQ), to store the generated embeddings. Herein, the index may refer to data structure to store and retrieve multidimensional vector data. The embeddings may enable faster searching where the search compares vectors. For example, when the natural language query is received, the embedding module 310 may generate the embeddings and use the vector store's 312 indexing to find the most similar stored embeddings.

Figure 4:
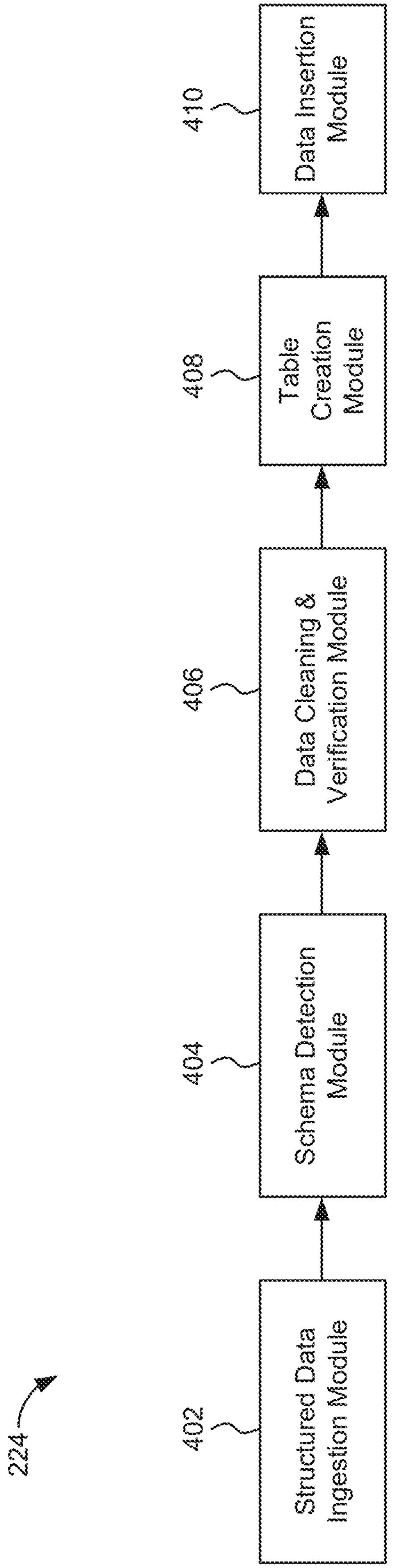
FIG. 4 illustrate a block diagram representation for retrieving a structured data from a structured data source, by the knowledge extraction module, in accordance with implementations of the present disclosure.

FIG. 4 illustrate a block diagram representation for retrieving the structured data from the structured data sources, by the knowledge extraction module 224 by the knowledge extraction module 224, in accordance with implementations of the present disclosure. The knowledge extraction module 224 may further include a structured data ingestion module 402, a schema detection module 404, a data cleaning and verification module 406, a table creation module 408 and a data insertion module 410. The structured data ingestion module 402 may retrieve the structured data from the structured data source (in the knowledge base 214). The schema detection module 404 may automatically infer the structure (schema) and format of incoming structured data, such as a CSV file or JSON document. Specifically, the schema detection module 404 may analyze the incoming structured data to identify data types and column names. The schema detection module 404 may infer the data type of each field or column by analyzing the data values, by utilizing techniques like, but not limited to, pattern matching, statistical analysis and regular expressions. The pattern matching may include identifying patterns in the data that correspond to specific data types (e.g., integers, floating-point numbers, dates, strings, booleans). The statistical analysis may include analyzing the distribution of data values to infer data types. The regular expressions may identify specific data formats (e.g., email addresses, phone numbers). Moreover, the schema detection module 404 may extracts field or column names from the structured data. To extract the field or column names, the schema detection module 404 may identify header row in the data which include the field names. The schema detection module 404 may further extract field names from metadata associated with the structured data. Field names may also be extracted using data sampling and pattern analysis. Furthermore, the schema detection module 404 may identify relationships between different data elements, such as primary keys, foreign keys, and referential integrity constraints.

The schema detection module 404, after inferring the structure and format of the structured data, may transmit the structured data to data cleaning and verification module 406. The data cleaning and verification module 406 may include, but not limited to, error detection, inconsistency detection and missing value detection. The error detection may include identifying values which do not conform to the inferred data type (e.g., a string in an integer field), values which fall outside an acceptable range (e.g., a negative age) and or values not adhering to a specific format (e.g., an invalid date or email address). The inconsistency detection may include identifying data values that contradict each other or violate consistency rules, such as duplicate records (records with identical or near-identical values), conflicting values (values which contradict each other across different fields or records) and referential integrity violations (foreign key values which may not match primary key values in related tables). Thereafter, the data cleaning and verification module 406 may rectify the detected error, inconsistencies and missing values. The rectification may include, but not limited to, converting data values to the correct data type, replacing erroneous values with corrected values or default values and correcting data values to adhere to the required format. The rectification may further include rectifying inconsistencies between data values, such as removing duplicate records, resolving conflicting values by applying predefined rules or manual intervention, and ensuring that foreign key values match primary key values. Moreover, the data cleaning and verification module 406 may include filling in missing values using various techniques, such as mean/median imputation, mode imputation, regression imputation and k-nearest neighbors imputation. The mean/median imputation may refer to replacing missing values with the mean or median of the field. The mode imputation may refer to replacing missing values with the mode of the field. The regression imputation may refer to predicting missing values using regression models. The k-nearest neighbors imputation may refer to imputing missing values based on the values of similar records. The data cleaning and verification module 406 may further validates the structured data against the detected schema, thereby ensuring that the structured data conforms to the defined structure and constraints. The data cleaning and verification module 406 may utilize ML models for identifying outliers or anomalous data values. In essence, data cleaning and verification module 406 may ensure that the ingested structured data is reliable and accurate, enabling effective data analysis and knowledge discovery.

After cleaning and validation of the structured data by data cleaning and verification module 406, the structured data may be transmitted to the table creation module 408. The table creation module 408 may include defining the structure of the tables based on the detected structure (by the schema detection Module 404), including determine the data types, primary keys, and relationships between tables. The table creation process may ensure that the data is organized in a structured and efficient manner, facilitating easy retrieval and analysis. The table creation module 408 may first retrieve the validated schema which may be represented in a schema definition language (e.g., DDL, JSON Schema, XML Schema). The table creation module 408 may parses the schema definition to extract the necessary information for table creation, including, table names, column names and data types (e.g., integer, varchar, date, boolean), primary keys, foreign keys and constraints. Thereafter, the table creation module 408 may establishes a connection to the structured data source (e.g., database management system (DBMS)). The connection may be established by selecting the appropriate database driver based on the DBMS (e.g., Java Database Connectivity (JDBC) driver for relational databases) and providing the necessary connection parameters, such as database URL, username, and password. Following, the table creation module 408 may dynamically generates SQL Data Definition Language (DDL) statements based on the extracted schema definition. The table creation module 408 may further, executes the generated DDL statements against the DBMS. To execute the generated DDL statements against the DBMS, the table creation module 408 may sending the SQL statements to the DBMS for processing. The DBMS may parse and executes the DDL statements, creating the tables and the associated constraints. The table creation module 408 may implementing error handling to identify and rectify any errors occurrence during table creation. Additionally, the table creation module 408 may determine relationships between the created tables by identifying the foreign key constraints. For example, in the Orders table DDL, the CustomerID column may be defined as the foreign key referencing the CustomerID column in the Customers table.

After the table creation, the data insertion module 410 may load the cleaned and validated data (from the data cleaning and verification module 406) into the created tables (by table creation module 408) by using bulk techniques such as insert operations, ETL (extract, transform, and load) tools, or database-specific loading mechanisms.

Figure 5:
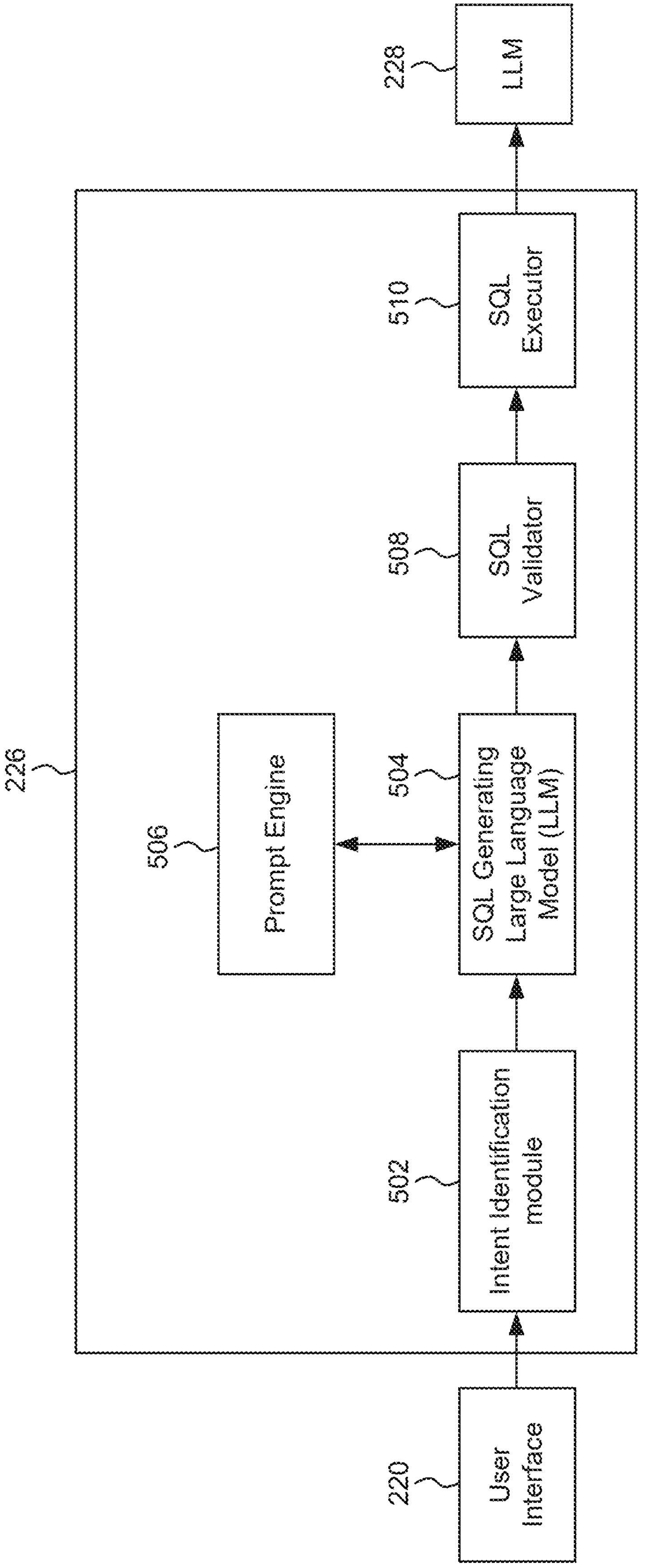
FIG. 5 illustrates a block diagram representation of a user processing module for processing a natural language query to extract contextual information from the structured data source, in accordance with implementations of the present disclosure.

FIG. 5 illustrates a block diagram representation of the user processing module 236 for processing the natural language query to extract contextual information from the structured data source, in accordance with implementations of the present disclosure. The user processing module 236 may further include an intent identification module 502, a SQL generating Large Language Model (LLM) 504, a SQL validator 508 and a SQL executor 510. The intent identification module 502 may determining an intent of the natural language query (received via user interface 220). Herein, the intent may refer to the underlying purpose or goal of the natural language query given a context. The natural language query may be processed using NLP techniques to analyze the syntactic and semantic structure. Specifically, the natural language query may be divides into individual words or tokens, by utilizing technique such as tokenization. The intent identification module 502 may assign each token a grammatical category (e.g., noun, verb, adjective) by using technique such as part-of-speech (POS) tagging. Furthermore, entities like people, places, organizations, dates, and quantities may be identified in the natural language query, by utilizing technique such as named entity recognition (NER). The intent identification module 502 may analyze the grammatical relationships between words in the sentence. Additionally, semantic roles of words in the sentence (e.g., agent, patient, object) may be identified. The intent identification module 502 may utilize ML model (e.g., a neural network, support vector machine) to classify the intent of the natural language query, based on the output of said NLP processing. The ML model may be trained on dataset of labeled natural language queries and the corresponding intents. Techniques like sentence embeddings or transformer models may be used to determine the semantic meaning of the natural language query for accurate classification of the intent. Following, the intent identification module 502 may extract relevant entities from the natural language query and map to corresponding entities in the database schema of the structured data source. The identified intent and extracted entities of the natural language query may be input to the SQL generating LLM 504. The SQL generating LLM 504 may output the automatically generated SQL query in response to inputting the natural language query. The automatic generation of SQL query may refer to the process of using AL/ML techniques to automatically generate SQL queries based on natural language query or a user-defined set of criteria, essentially translating plain language instructions given in the natural language query into executable SQL statements, allowing users even without extensive SQL knowledge to query the database by simply describing information required to be retrieved. The SQL generating LLM 504 may be trained to analyze the natural language queries and generate corresponding SQL queries. The SQL generating LLM 504 may establish a connection to the structured data source where the structured data is stored, including authentication details and access the database schema of said structured data source to identify elements such as table structures and column names. The prompt engine 506 may provide structured prompt, including the natural language query, identified intent, extracted entities, and relevant schema information to the SQL generating LLM 504. In an aspect, the prompt engine 506 may utilize pre-defined template to instruct the SQL generating LLM 504 to generate the SQL query in a structured format. The SQL generating LLM 504 may utilize the trained knowledge and reasoning capabilities to map the identified elements to the corresponding tables and columns in the structured data source. Further, the SQL generating LLM 504 may determine the appropriate SQL clauses (e.g., SELECT, FROM, WHERE, JOIN, GROUP BY). The SQL generating LLM 504 may further determine the corresponding SQL syntax to identify and analyze the relationships between tables. The SQL generating LLM 504 may utilize structured data source metadata to identify the relevant tables and the relationships. The metadata may enable the SQL generating LLM 504 to determine the semantic meaning of the database schema and generate accurate SQL queries. The SQL generating LLM 504 may output the automatically generated SQL query as a string. The structure of the string may include one or more clauses like, but not limited to, SELECT clause, FROM clause, WHERE clause, JOIN clauses, GROUP BY and ORDER BY clauses. The clauses may facilitate built-in functions such as filter, group, sort, and limit data retrieval in SQL statements. Furthermore, the generated SQL queries from the SQL generating LLM 504 may be validated for syntax and semantic correctness by the SQL validator 508. The SQL validator 508 may parse the automatically generated SQL query and identify the dialects (for example keywords, data type declarations, or function names). The dialects may refer to variations in syntax and features existing between different structured data sources (like DBMS). Each database in the structured data source may include a set of rules for writing SQL queries. Therefore, the SQL validator 508 may identify the correct dialect for validating the SQL query to ensure the compatibility with the target structured data source. Moreover, SQL validator 508 may access specific fields of the structured data source and identify the tables and fields which may be accessed via the SQL query. In an aspect, using simple cross-check of the structure of said structured data source, the SQL validator 508 may validate the SQL query.

After validation of the automatically generated SQL query, the SQL executor 510 may select an agent to execute the automatically generated SQL query on the structed data source based on the intent of the natural language query. Herein, the agents may be capable of executing sequences of actions like executing stored procedures, running scripts, or sending notifications. In an aspect, the agent may execute the first step then move on to the next defined in the sequences of actions, based on whether the first step succeeded or failed. The agent may continue executing until all the steps are executed and the sequences of action are completed, or a step fails. The agent may also provide information on whether the execution of sequences of action succeeds or fails. The SQL executor 510 may select from a plurality of agent, such as, SQL agents, LangChain agents, Pandas agents, or the like. The SQL agents may be specialized in executing SQL queries against relational databases. The LangChain agents may be specialized in interacting with various data sources, including files and APIs, using the LangChain framework. The Pandas agents may be specialized in processing and analyzing data using the Pandas library, often used for data manipulation and analysis.

Further, the SQL executor 510 may establish mapping between identified intent and the corresponding agents capable of handling said intents. The mapping may be established by using rule-based systems (for example, if-then-else rules which may map specific intents to agents), configuration files (for example, JSON or YAML files which may define the intent-agent mapping) and/or ML models (for example, models trained to predict the appropriate agent for the identified intent). The SQL executor 510 may analyzes the identified intent and determine the required structured data source and processing capabilities. Based on the intent-agent mapping, the SQL executor 510 may select the most appropriate agent(s) to handle the query. If multiple agents are required, the SQL executor 510 may orchestrates the execution and combines the results. Thereafter, SQL executor 510 may establishes a connection to the target structured data source using the database connector (e.g., JDBC, Open Database Connectivity (ODBC), Python database connector). The generated SQL query may be thereafter transmitted to the target structured data source for execution and retrieval of the requested data. The structured data source may first parse the SQL query, into individual words, called tokens. Moreover, structured data source may ensure the SQL query has a valid verb and valid clauses. Syntax errors and misspellings may also be detected by the structured data source. Following, structured data source may perform a validation procedure on the generated SQL query, to ensure syntactic and semantic correctness, as well as authorization compliance. For instance, the structured data source may query the relevant system catalog to verify the existence of all tables referenced in the FROM clause of the SQL query. The structured data source may further verify the existence and unambiguous naming of all columns referenced in the SELECT, WHERE, GROUP BY, ORDER BY, and other relevant clauses against the table schemas within said system catalog. After that the structured data source may generate plurality of access strategies for the statement. The access strategies may refer to a binary representation of the steps required to execute the SQL query. Furthermore, the structured data source may include determining the most appropriate access strategy to execute the SQL query, considering factors such as index utilization for accelerated searches, optimal join order between tables (e.g., applying search conditions before or after joins), and strategies to minimize or eliminate sequential table scans. The structured data source may execute the SQL query by implementing the selected access strategy to retrieve the required data. The retrieved data may be returned to the SQL executor 510 in a structured format (e.g., a table or a result set). The selected agent by the SQL executor 510 may retrieves the results from the structured data base and generate output formatted into a suitable format for further processing or presentation (e.g., a Pandas DataFrame, JSON, CSV).

In an example, the natural language query may be "Show me the total sales for product 'Widget A' in the last quarter". The intent identification module 502 may identify the intent as "retrieve sales data" and extracts the entities "Widget A" and "last quarter". The SQL generating LLM 504 may selects the SQL agent because the data may be stored in the structured data source (like relational database). SQL generating LLM 504 may generate the SQL query as expressed below:

```
SELECT SUM (Sales)
FROM Sales
WHERE Product='Widget A'
AND SaleDate>=DATE_SUB(CURDATE( ), INTER-
  VAL 3 MONTH);
```

The SQL agent may establish connection to the relational database. The SQL executor 510 may execute the SQL query and result (the total sales) may be retrieved from the relational database.

The output from the SQL executor 510 may be further sent to the LLM 228. The LLM 228 may optimize the received output from the SQL executor 510 to articulate in a manner aligning with the natural language query. Based on the identified intent, the response may include, but not limited to, insights data, metric data, tabular data with rows and columns, or chart data. Additionally, the response may include contextual explanations enabling. The response may further include visual aids such as graphs or charts, thereby enhancing comprehension. Furthermore, the response may include key trends and patterns, offering actionable insights facilitating decision-making. Additionally, the response may include summaries.

Figure 6:
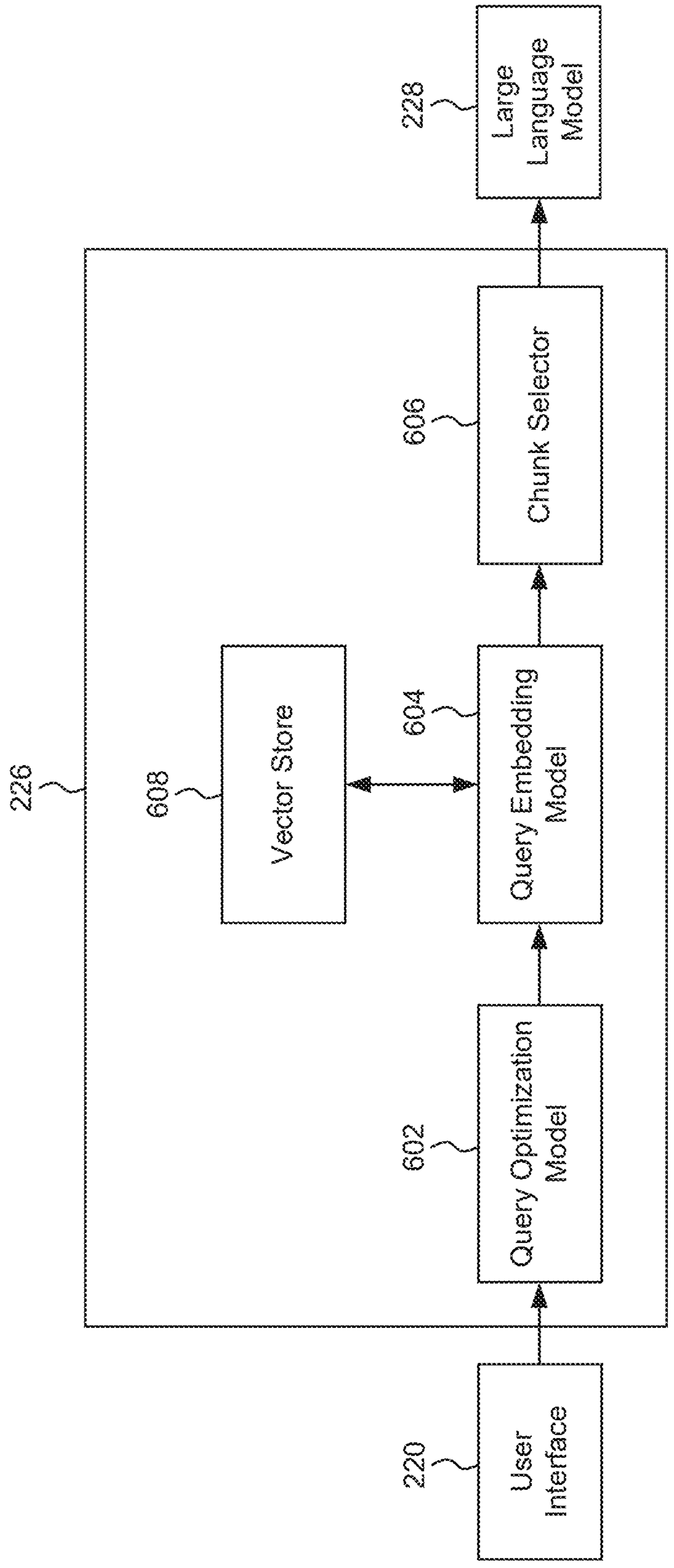
FIG. 6 illustrates a block diagram representation of the user processing module for processing the natural language query to extract contextual information from the unstructured data source, in accordance with implementations of the present disclosure.

FIG. 6 illustrates a block diagram representation of the user processing module 236 for processing the natural language query to extract contextual information from the unstructured data source, in accordance with implementations of the present disclosure. The user processing module 236 may further include a query optimization module 602, a query embedding module 604, a chunk selector 606 and a vector store 608. The query optimization module 602 classify the natural language query (received via user interface 220) into the category. The category may include one or more of the use-case based type and the exploratory type. Moreover, the query optimization module 602 may further optimize the natural language query by performing one or more of stop word removal, synonym expansion, and dynamic query rewriting. The stop word removal may include eliminating common, non-semantic words (e.g., "the," "a," "is") using predefined or custom stop word lists. The synonym expansion may include replacing keywords with synonyms from lexical databases (e.g., WordNet) or embedding-based similarity to broaden the search scope. The dynamic query rewriting may include automatically modifying the natural language query based on inferred user intent. Specifically, the query optimization module 602 may add context to clarify ambiguous queries, add related terms to broaden the search and add filters to narrow the search. In an example, the natural language query may be "What is the process for applying for a refund?". The query optimization module 602 may optimize the natural language query by performing stop word removal, by removing the word "the" as, the word "the" may not contribute significantly to the natural language query's meaning. Thus, the natural language query's size may be reduced, and efficiency may be improved. Additionally, the query optimization module 602 may optimize the natural language query via synonym expansion. For instance, natural language query may be expanded to include related terms like "refund process," "request refund," and "initiate refund." Thus, the search scope may be broadened and the likelihood of finding relevant documents may be increased In an aspect, the query optimization module 602 may storing frequently executed natural language queries and the corresponding results in a cache (not shown in FIG. 6) (e.g., Redis, Memcached). Upon receiving the natural language query, the query optimization module 602 may search the cache for a match. If the match is found, the cached result may be returned directly, bypassing database or retrieval system processing. Moreover, the query optimization module 602 may utilizing vector embeddings (e.g., generated by Sentence-BERT, Word2Vec) to determine semantic relationships between the natural language query and the unstructured data, thereby, enabling retrieval based on meaning rather than exact keyword matches. The query optimization module 602 may utilize techniques (e.g., k-nearest neighbors) to retrieve only the top-k most relevant results, thereby reducing the amount of data processed. Additionally, the query optimization module 602 may utilize pre-built indexes (e.g., B-trees, inverted indexes, vector indexes) to accelerate data retrieval.

Upon the optimization of the natural language query, the query optimization module 602 may transmit the natural language query to the query embedding module 604. The query embedding module 604 may transform the received natural language query into vector embeddings and store said vector embeddings into a vector store 608. The transformation into vector embeddings may be implemented by using a pre-trained embedding model (e.g., Sentence-BERT, OpenAI Embeddings, etc.). Moreover, vector store 608 may create indexes, by utilizing indexing algorithms, to store the vector embeddings. Herein, the index may refer to data structure to stores and retrieves multidimensional vector data. The vector embeddings may enable faster searching where the search compares vectors rather than characters. Additionally, the vector embeddings may determine the semantic meaning of the natural language query, enabling the similarity comparisons with data chunks.

The knowledge extraction module 224 may store the vector embeddings of the chunks created by the chunking module 308, in the vector store 312. The chunk selector 606 may scans through the embeddings to find the chunks that are most similar to the natural language query vector embeddings. The similarity between the vector embeddings of the natural language query (stored in vector store 608) and vector embedding each data chunk (stored in vector store 312) may be calculated using a distance metric, including, but not limited to, cosine similarity and Euclidean distance. The cosine similarity may include measuring the cosine of the angle between two vectors embeddings, indicating their semantic similarity. Higher cosine similarity values may indicate greater similarity. The Euclidean distance may include measuring the geometric distance between two vector embeddings. Shorter Euclidean distances may indicate greater similarity. The chunk selector 606 may, further, utilize technique such as k-nearest neighbors (KNN) and identify the k-nearest neighbors (i.e., the k most similar data chunks) to the vector embedding of the natural language query. The KNN technique may calculate the distance between the vector embeddings of the natural language query and vector embedding of each data chunk and selects the k chunks with the shortest distances or highest similarity scores. In an aspect, the chunk selector 606 may utilize clustering techniques to group similar data chunks together. Moreover, the chunk selector 606 may utilize ML models to rank the relevance of data chunks based on their similarity to the natural language query. The selected top chunks along with the natural language query may be sent to the LLM 228 to generate the relevant and contextually accurate response. Consequently, the response generated by the LLM 228 may be received and displayed on the user interface 220.

Figure 7:
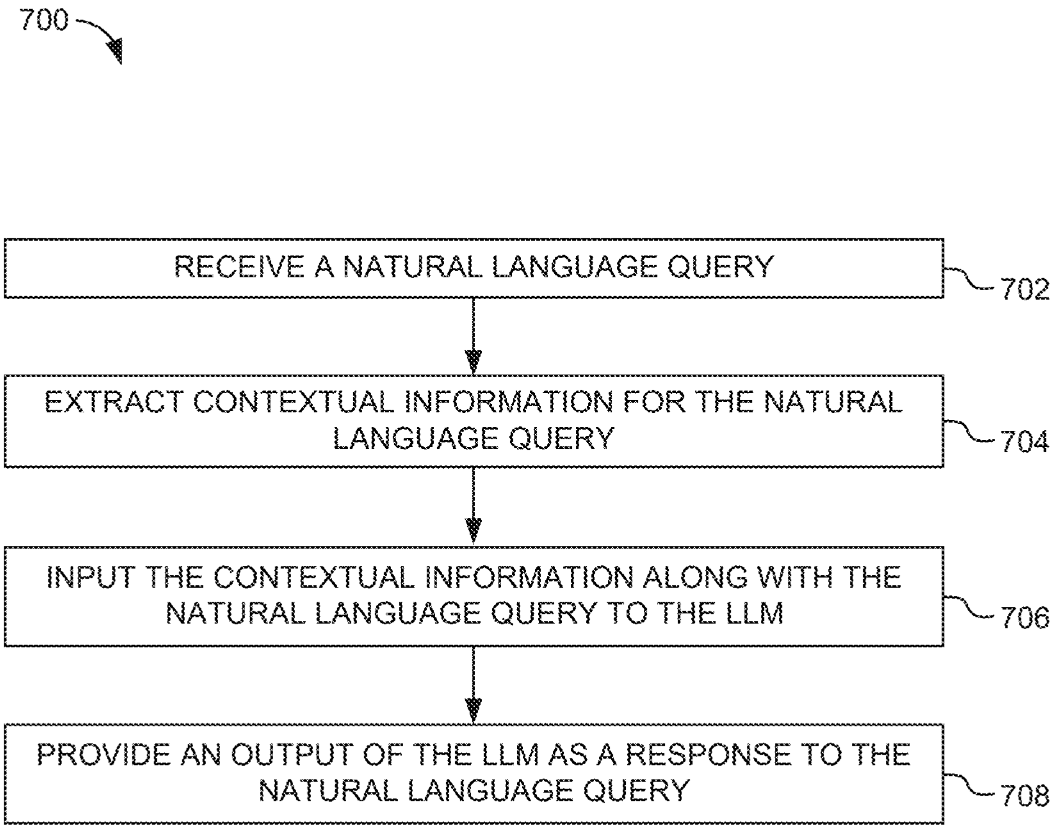
FIG. 7 illustrates a flow diagram of an example method for implementation information retrieval and knowledge management by the back-end system, in accordance with implementations of the present disclosure.

FIG. 7 illustrates a flow diagram of an example processor-executable method 700 for implementing information retrieval and management of the knowledge base 214 by the back-end system 106, in accordance with implementations of the present disclosure. In some examples, the processor-executable method 700 may be executed using the one or more processors 204 disclosed in related to FIGS. 1-6.

The processor-executable method 700 may include receiving 702 the natural language query for information to be retrieved from the knowledge base 214. The knowledge base 214 may include the structured data source and the unstructured data source.

The processor-executable method 700 may include extracting 704 contextual information for the natural language query from the knowledge base 214. Specifically, domain-based chunking and tagging of relevant documents may be implemented to extract contextual information for the natural language query from the unstructured data source. Further, the automatically generated Structured Query Language (SQL) query may be executed to extract contextual information for the natural language query from the structured data source.

The processor-executable method 700 may include inputting 706 the contextual information along with the natural language query to the large language model (LLM) 228. Additionally, Responsible Artificial Intelligence (RAI) filter may be applied to the natural language query for detecting non-compliance with ethical standards in the natural language query.

The processor-executable method 700 may include 708 providing the output of the LLM 228 as the response to the natural language query. Specifically, the output of the LLM 228 may include one or more of metric data, tabular data including rows and columns, chart data, and summary. Moreover, apply RAI filter may be applied to analyze the output of the LLM 228 for detecting non-compliance with ethical standards to be applied to the LLM 228.

Implementations of the present disclosure provide technical advancements in the context of to information retrieval and knowledge management. For example, the present disclosure, implementation of domain-based chunking for extraction of contextual information (by the chunking module 308), the back-end system 106 may extract specific, relevant information from various sources, identify and key details, entities, or context, facilitating efficient data mining and information retrieval. Moreover, the back-end system 106 may processes multi-modal data efficiently, including text, images, and audio or video. The present disclosure uses vectors to represent and analyze different data types, allowing for a comprehensive approach to information retrieval and analysis.

Furthermore, the use of metadata provides valuable context about the content within each chunk. This allows back-end system 106 to go beyond simple keyword matching and consider semantic relationships, document structure, and other relevant factors.

Figure 8:
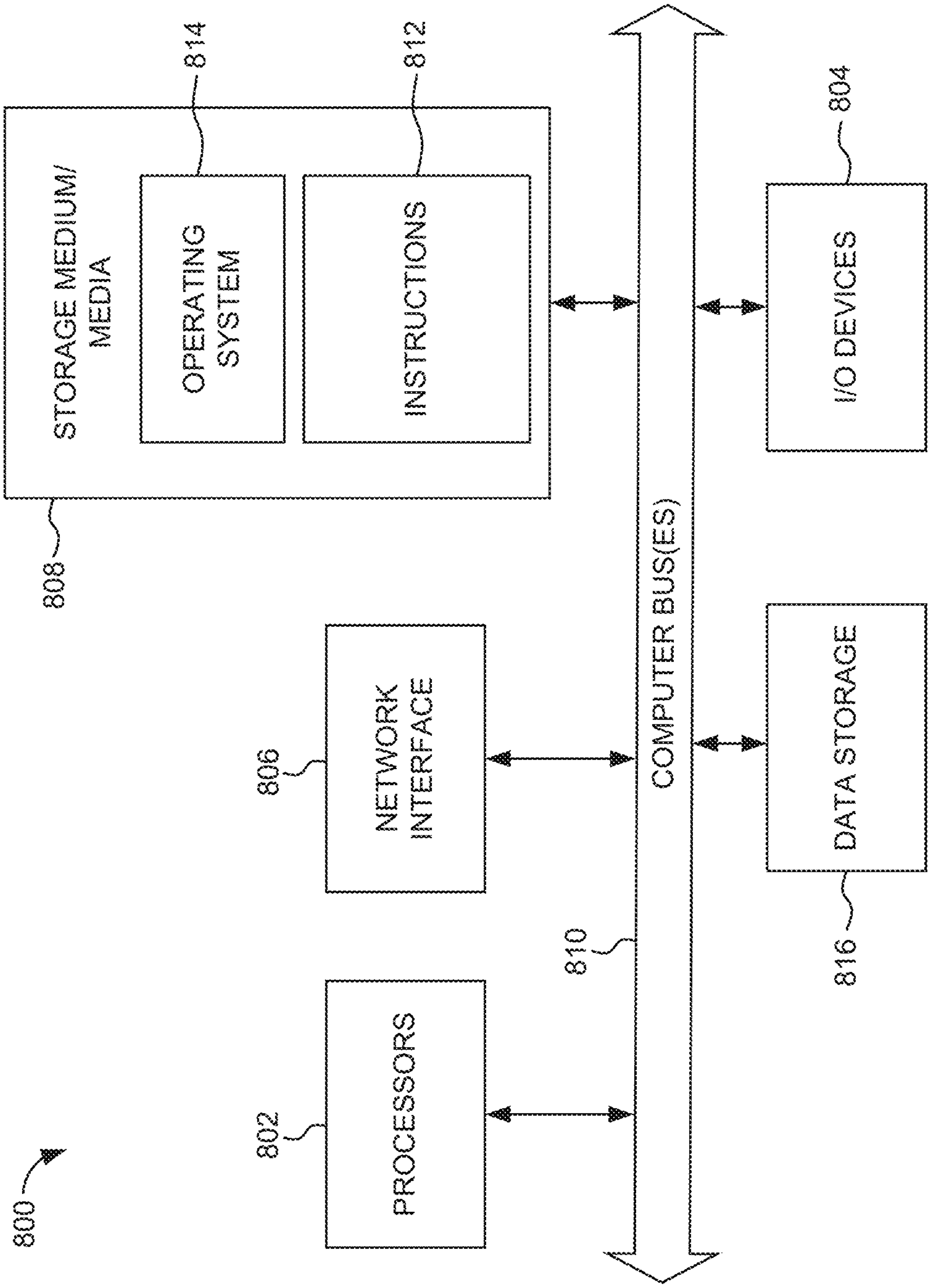
FIG. 8 illustrates a computer system that may be used to implement the back-end system disclosed in the example environment of FIG. 1. for information retrieval and management of knowledge base, in accordance with implementations of the present disclosure Like reference numbers and designations in the various drawings indicate like elements.

FIG. 8 illustrates a computer system 800 that may be used to implement the back-end system 106 disclosed in the example environment of FIG. 1. for information retrieval and management of the knowledge base 214, in accordance with implementations of the present disclosure. More particularly, computing machines such as desktops, laptops, smartphones, tablets, and wearables which may be used to implement the tasks that may have the structure of the computer system 800. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802, such as a central processing unit, ASIC or another type of processing circuit, input/output devices 804, such as a display, mouse keyboard, etc., a network interface 806, such as a Local Area Network (LAN), a wireless 502.11x LAN, a 3G or 4G mobile WAN or a WiMax WAN, and a computer-readable medium 808. Each of these components may be operatively coupled to a bus 810. The computer-readable medium 808 may be any suitable medium that participates in providing instructions to the processor(s) 802 for execution. For example, the computer-readable medium 808 may be non-transitory or non-volatile medium, such as a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the system for information retrieval and knowledge management.

The system may be implemented as software stored on a non-transitory processor-readable medium and executed by the processors 802. For example, the computer-readable medium 808 may store an operating system 814, such as MAC OS, MS WINDOWS, UNIX, or LINUX, and code for the system. The operating system 814 may be multi-user, multiprocessing, multitasking, multithreading, real-time, and the like. For example, during runtime, the operating system 814 is running and the code for the system is executed by the processor(s) 802.

The computer system 800 may include a data storage 816, which may include non-volatile data storage. The data storage 816 stores any data used or generated by the system.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:

at least one hardware processor; and at least one non-transitory processor-readable medium storing instructions to be executed by the at least one hardware processor to:

receive a natural language query for information to be retrieved from a knowledge base, wherein the knowledge base includes a structured data source and an unstructured data source;

apply a Responsible Artificial Intelligence (RAI) filter for detecting non-compliance with predefined standards in the natural language query;

extract contextual information for the filtered natural language query from the knowledge base by at least one of:

domain-based chunking and tagging of relevant documents in the unstructured data source; and executing an automatically generated Structured Query Language (SQL) query, on the structured data source;

input the contextual information along with the natural language query to a large language model (LLM); and provide an output of the LLM as a response to the natural language query.

2. The system of claim 1, wherein the at least one non-transitory processor-readable medium storing further instructions that cause the at least one hardware processor to:

apply the RAI filter that analyzes the output of the LLM for detecting non-compliance with predefined standards; and provide the filtered output as the response to the natural language query.

3. The system of claim 1, wherein to extract the contextual information from the structured data source the at least one non-transitory processor-readable medium stores further instructions that cause the at least one hardware processor to:

input the natural language query to an SQL generating Large Language Model (LLM); and obtain the automatically generated SQL query as an output from the SQL generating LLM in response to the natural language query.

4. The system of claim 1, wherein to extract the contextual information from the structured data source the at least one non-transitory processor-readable medium stores further instructions that cause the at least one hardware processor to:

determine an intent of the natural language query; and select an agent to execute the automatically generated SQL query on the structured data source based on the intent.

5. The system of claim 3, wherein to extract the contextual information from the unstructured data source, the at least one non-transitory processor-readable medium stores further instructions that cause the at least one hardware processor to:

classify the natural language query into a category, wherein the category includes at least one of a use-case based type, and an exploratory type.

6. The system of claim 1, wherein to extract the contextual information from the unstructured data source the at least one non-transitory processor-readable medium stores further instructions that cause the at least one hardware processor to:

further optimize the natural language query by performing one or more of stop word removal, synonym expansion, and dynamic query rewriting.

7. The system of claim 6, wherein to input the contextual information, the at least one non-transitory processor-readable medium stores further instructions that cause the at least one hardware processor to:

determine a quantum of the contextual information to be input to the LLM based on the type of the natural language query.

8. The system of claim 5, wherein to input the contextual information the at least one non-transitory processor-readable medium stores further instructions that cause the at least one hardware processor to:

determine that the quantum of contextual information to be input to the LLM is based on corresponding percentages of the contextual information extracted from the structured data source and the unstructured data source.

9. The system of claim 5, wherein to execute the domain-based chunking, the at least one non-transitory processor-readable medium stores further instructions that cause the at least one hardware processor to:

create chunks from the relevant documents based on the type of the natural language query.

10. The system of claim 9, wherein to create the chunks based on the type of the natural language prompt, the at least one non-transitory processor-readable medium stores further instructions that cause the at least one hardware processor to:

create fine-grained chunks when the natural language query is of the use-case based type; and create larger, context-preserving chunks when the natural language query is of the exploratory type.

11. The system of claim 10, wherein to execute the domain-based chunking, the at least one non-transitory processor-readable medium stores further instructions that cause the at least one hardware processor to:

create chunks from the relevant documents based on document structures.

12. The system of claim 1, wherein to execute the tagging of the relevant documents, the at least one non-transitory processor-readable medium stores further instructions that cause the at least one hardware processor to:

attach domain-specific metadata to chunks of the relevant documents.

13. A processor-executable method comprising:

receiving, by the processor, a natural language query for information to be retrieved from a knowledge base that includes a structured data source and an unstructured data source;

applying a Responsible Artificial Intelligence (RAI) filter for detecting non-compliance with predefined standards in the natural language query;

extracting, by the processor, contextual information for the filtered query from the knowledge base by at least one of:

domain-based chunking and tagging of relevant documents in the unstructured data source; and executing an automatically generated Structured Query Language (SQL) query on the structured data source;

inputting, by the processor, the contextual information along with the natural language prompt to at least a large language model (LLM); and providing, by the processor, an output of the LLM as a response to the natural language prompt.

14. The processor-executable method of claim 13, wherein inputting the contextual information further comprises:

combining, by the processor, the contextual information including structured data from the structured data source and unstructured data from the unstructured data source;

adjusting, by the processor, a proportion of the structured data and the unstructured data based on the category of the natural language query selected from at least one of the use-case based type, and the exploratory type; and inputting, by the processor to the LLM, the contextual information formatted based on a prompt template.

15. The processor-executable method of claim 13, further comprises:

adding, by the processor, the natural language prompt issued to a log of issued requests, wherein the log includes a time of a request including the natural language prompt, a type of the request, resources accessed, and a user or an application making the request, a response time and computational resources used.

16. The processor-executable method of claim 15, further comprises:

determining, by the processor from the log of issued requests, a number of tokens processed by the LLM for a user account issuing the natural language prompt; and selecting, by the processor via a rules engine, the LLM from a plurality of LLMs based on the number of processed tokens.

17. A non-transitory processor-readable storage medium comprising machine-readable instructions that cause a processor to:

receive a natural language query for information to be retrieved from a knowledge base that includes a structured data source and an unstructured data source;

apply a Responsible Artificial Intelligence (RAI) filter for detecting non-compliance with predefined standards in the natural language query;

extract contextual information for the filtered query from the knowledge base by at least one of:

domain-based chunking and tagging of relevant documents in the unstructured data source; and executing an automatically generated Structured Query Language (SQL) query on the structured data source;

input the contextual information along with the natural language prompt to at least a large language model (LLM); and provide an output of the LLM as a response to the natural language prompt.

18. The non-transitory processor-readable storage medium of claim 17, comprising further machine-readable instructions that cause the processor to:

apply the RAI filter that analyzes the output of the LLM for detecting non-compliance with predefined standards to be applied to the LLM.

19. The non-transitory processor-readable storage medium of claim 17, wherein the output of the LLM includes at least one of metric data, tabular data including rows and columns, chart data, and summary.

* * * * *